(12) United States Patent
Hyland et al.

(10) Patent No.: US 10,857,403 B2
(45) Date of Patent: *Dec. 8, 2020

(54) INFRASTRUCTURE MONITORING DEVICES, SYSTEMS, AND METHODS

(71) Applicant: Mueller International, LLC, Atlanta, GA (US)

(72) Inventors: Gregory E. Hyland, Atlanta, GA (US); Robert Paul Keefe, Alpharetta, GA (US); Marietta Edmunds Zakas, Atlanta, GA (US); Clayton Robert Barker, Atlanta, GA (US)

(73) Assignee: Mueller International, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/675,507

(22) Filed: Nov. 6, 2019

(65) Prior Publication Data

US 2020/0069987 A1 Mar. 5, 2020

Related U.S. Application Data

(63) Continuation of application No. 15/817,172, filed on Nov. 18, 2017, which is a continuation of application (Continued)

(51) Int. Cl.
*A62C 37/50* (2006.01)
*F16K 27/00* (2006.01)
(Continued)

(52) U.S. Cl.
CPC .............. *A62C 37/50* (2013.01); *A62C 35/20* (2013.01); *E03B 9/02* (2013.01); *E03B 9/06* (2013.01);
(Continued)

(58) Field of Classification Search
CPC ......... Y10T 137/5468; Y10T 137/5762; F16K 27/006; E03B 9/00–20; A62C 35/20; A62C 37/50
(Continued)

(56) References Cited

U.S. PATENT DOCUMENTS 1,738,094 A   12/1929   Caldwell
2,171,173 A   8/1939    Coyer
(Continued)

FOREIGN PATENT DOCUMENTS

AU   2011265675   5/2015
AU   2015202550   11/2017
(Continued)

OTHER PUBLICATIONS

Oritz, Jorge Isaac; Office Action for Canadian patent application No. 3,070,690, filed Dec. 20, 2016, dated Mar. 10, 2020, 3 pgs.
(Continued)

*Primary Examiner* — Kevin F Murphy
*Assistant Examiner* — Jonathan J Waddy
(74) *Attorney, Agent, or Firm* — Taylor English Duma LLP

(57) ABSTRACT

An infrastructure monitoring assembly includes a fire hydrant; a pipe connected in fluid communication with the fire hydrant, a fluid at least partially filling the pipe; a sensor positioned in the fluid, the sensor configured to measure a parameter of the fluid; and a processor connected in communication with the sensor, the processor configured to receive a signal from the sensor.

33 Claims, 4 Drawing Sheets

Related U.S. Application Data

No. 14/848,676, filed on Sep. 9, 2015, now Pat. No. 9,849,322, which is a continuation of application No. 14/557,754, filed on Dec. 2, 2014, now Pat. No. 9,861,848, which is a continuation of application No. 13/101,235, filed on May 5, 2011, now Pat. No. 8,931,505.

(60) Provisional application No. 61/355,468, filed on Jun. 16, 2010.

(51) Int. Cl.

| | |
|---|---|
| E03B 9/06 | (2006.01) |
| A62C 35/20 | (2006.01) |
| E03B 9/02 | (2006.01) |
| F17D 5/00 | (2006.01) |
| G01D 4/00 | (2006.01) |
| G01F 1/46 | (2006.01) |
| F17D 5/02 | (2006.01) |
| F17D 1/04 | (2006.01) |
| G01M 3/00 | (2006.01) |
| H04B 1/03 | (2006.01) |

(52) U.S. Cl.
CPC ............ *F16K 27/006* (2013.01); *F17D 1/04* (2013.01); *F17D 5/00* (2013.01); *F17D 5/02* (2013.01); *G01D 4/004* (2013.01); *G01F 1/46* (2013.01); *G01M 3/00* (2013.01); *H04B 1/03* (2013.01); *Y02B 90/20* (2013.01); *Y02E 60/34* (2013.01); *Y04S 20/30* (2013.01); *Y10T 137/5468* (2015.04); *Y10T 137/5485* (2015.04); *Y10T 137/7043* (2015.04); *Y10T 137/8158* (2015.04)

(58) Field of Classification Search
USPC ............... 137/296, 312, 377, 551; 340/603; 239/71; 138/90, 104; 73/40.5 A, 592
See application file for complete search history.

(56) References Cited

U.S. PATENT DOCUMENTS

| | | |
|---|---|---|
| 3,254,528 A | 6/1966 | Michael |
| 3,592,967 A | 7/1971 | Harris |
| 3,612,922 A | 10/1971 | Furnival |
| 3,662,600 A | 5/1972 | Rosano, Jr. et al. |
| 3,673,856 A | 7/1972 | Panigati |
| 3,815,129 A | 6/1974 | Sweany |
| 4,000,753 A | 1/1977 | Ellis |
| 4,056,970 A | 11/1977 | Sollish |
| 4,083,229 A | 4/1978 | Anway |
| 4,333,028 A | 6/1982 | Panton |
| 4,431,873 A | 2/1984 | Dunn et al. |
| 4,462,249 A | 7/1984 | Adams |
| 4,467,236 A | 8/1984 | Kolm et al. |
| 4,543,817 A | 10/1985 | Sugiyama |
| 4,796,466 A | 1/1989 | Farmer |
| 4,844,396 A | 7/1989 | Norton |
| 4,930,358 A | 6/1990 | Motegi et al. |
| 4,984,498 A | 1/1991 | Fishman |
| 5,038,614 A | 8/1991 | Bseisu et al. |
| 5,052,215 A | 10/1991 | Lewis |
| 5,078,006 A | 1/1992 | Maresca et al. |
| 5,085,082 A | 2/1992 | Cantor et al. |
| 5,090,234 A | 2/1992 | Maresca et al. |
| 5,117,676 A | 6/1992 | Chang |
| 5,118,464 A | 6/1992 | Richardson et al. |
| 5,163,314 A | 11/1992 | Maresca et al. |
| 5,165,280 A | 11/1992 | Sternberg et al. |
| 5,170,657 A | 12/1992 | Maresca et al. |
| 5,174,155 A | 12/1992 | Sugimoto |
| 5,187,973 A | 2/1993 | Kunze et al. |
| 5,189,904 A | 3/1993 | Maresca et al. |
| 5,201,226 A | 4/1993 | John et al. |
| 5,203,202 A | 4/1993 | Spencer |
| 5,205,173 A | 4/1993 | Allen |
| 5,209,125 A | 5/1993 | Kalinoski et al. |
| 5,218,859 A | 6/1993 | Stenstrom et al. |
| 5,243,862 A | 9/1993 | Latimer |
| 5,254,944 A | 10/1993 | Holmes et al. |
| 5,272,646 A | 12/1993 | Farmer |
| 5,279,160 A | 1/1994 | Koch |
| 5,287,884 A | 2/1994 | Cohen |
| 5,298,894 A | 3/1994 | Cerny et al. |
| 5,303,592 A | 4/1994 | Livingston |
| 5,319,956 A | 6/1994 | Bogle et al. |
| 5,333,501 A | 8/1994 | Okada et al. |
| 5,335,547 A | 8/1994 | Nakajima et al. |
| 5,343,737 A | 9/1994 | Baumoel |
| 5,349,568 A | 9/1994 | Kupperman et al. |
| 5,351,655 A | 10/1994 | Nuspl |
| 5,361,636 A | 11/1994 | Farstad et al. |
| 5,367,911 A | 11/1994 | Jewell et al. |
| 5,385,049 A | 1/1995 | Hunt et al. |
| 5,396,800 A | 3/1995 | Drinon et al. |
| 5,408,883 A | 4/1995 | Clark et al. |
| 5,416,724 A | 5/1995 | Savic |
| 5,461,906 A | 10/1995 | Bogle et al. |
| 5,519,184 A | 5/1996 | Umlas |
| 5,526,691 A | 6/1996 | Latimer et al. |
| 5,531,099 A | 7/1996 | Russo |
| 5,548,530 A | 8/1996 | Baumoel |
| 5,581,037 A | 12/1996 | Kwun et al. |
| 5,591,912 A | 1/1997 | Spisak et al. |
| 5,602,327 A | 2/1997 | Torizuka et al. |
| 5,611,948 A | 3/1997 | Hawkins |
| 5,619,423 A | 4/1997 | Scrantz |
| 5,623,203 A | 4/1997 | Hosohara et al. |
| 5,633,467 A | 5/1997 | Paulson |
| 5,639,958 A | 6/1997 | Lange |
| 5,655,561 A | 8/1997 | Wendel et al. |
| 5,686,828 A | 11/1997 | Peterman et al. |
| 5,708,211 A | 1/1998 | Jepson et al. |
| 5,754,101 A | 5/1998 | Tsunetomi et al. |
| 5,760,306 A | 6/1998 | Wyatt et al. |
| 5,789,720 A | 8/1998 | Lagally et al. |
| 5,798,457 A | 8/1998 | Paulson |
| 5,838,633 A | 11/1998 | Sinha |
| 5,866,820 A | 2/1999 | Camplin et al. |
| 5,892,163 A | 4/1999 | Johnson |
| 5,907,100 A | 5/1999 | Cook |
| 5,965,818 A | 10/1999 | Wang |
| 5,970,434 A | 10/1999 | Brophy et al. |
| 5,974,862 A * | 11/1999 | Lander ................. G01M 3/243 702/51 |
| 5,987,990 A * | 11/1999 | Worthington .......... G01N 29/14 73/40.5 A |
| 6,000,277 A | 12/1999 | Smith |
| 6,000,288 A | 12/1999 | Kwun et al. |
| 6,003,376 A | 12/1999 | Burns et al. |
| 6,023,986 A | 2/2000 | Smith et al. |
| 6,035,717 A | 3/2000 | Carodiskey |
| 6,058,957 A * | 5/2000 | Honigsbaum ............. E03B 9/02 137/1 |
| 6,076,407 A | 6/2000 | Levesque et al. |
| 6,082,193 A | 7/2000 | Paulson |
| 6,104,349 A | 8/2000 | Cohen |
| 6,125,703 A | 10/2000 | MacLauchlan et al. |
| 6,127,823 A | 10/2000 | Atherton |
| 6,127,987 A | 10/2000 | Maruyama et al. |
| 6,138,512 A | 10/2000 | Roberts et al. |
| 6,138,514 A | 10/2000 | Iwamoto et al. |
| 6,164,137 A | 12/2000 | Hancock et al. |
| 6,170,334 B1 | 1/2001 | Paulson |
| 6,175,380 B1 | 1/2001 | Van Den Bosch |
| 6,192,352 B1 | 2/2001 | Alouani et al. |
| 6,243,657 B1 | 6/2001 | Tuck et al. |
| 6,267,000 B1 | 7/2001 | Harper et al. |
| 6,276,213 B1 | 8/2001 | Lee et al. |
| 6,296,066 B1 | 10/2001 | Terry |
| 6,343,510 B1 | 2/2002 | Neeson et al. |

(56) References Cited

U.S. PATENT DOCUMENTS

| | | | |
|---|---|---|---|
| 6,363,788 B1 | 4/2002 | Gorman et al. | |
| 6,389,881 B1 | 5/2002 | Yang et al. | |
| 6,401,525 B1 | 6/2002 | Jamieson | |
| 6,404,343 B1 | 6/2002 | Andou et al. | |
| 6,442,999 B1 | 9/2002 | Baumoel | |
| 6,453,247 B1 * | 9/2002 | Hunaidi | G01M 3/243 |
| | | | 702/51 |
| 6,470,749 B1 | 10/2002 | Han et al. | |
| 6,530,263 B1 * | 3/2003 | Chana | F17D 5/06 |
| | | | 73/40.5 A |
| 6,561,032 B1 | 5/2003 | Hunaidi | |
| 6,567,006 B1 | 5/2003 | Lander et al. | |
| 6,578,422 B2 | 6/2003 | Lam et al. | |
| 6,595,038 B2 | 7/2003 | Williams et al. | |
| 6,606,059 B1 | 8/2003 | Barabash | |
| 6,624,628 B1 | 9/2003 | Kwun et al. | |
| 6,647,762 B1 | 11/2003 | Roy | |
| 6,651,503 B2 | 11/2003 | Bazarov et al. | |
| 6,666,095 B2 | 12/2003 | Thomas et al. | |
| 6,667,709 B1 | 12/2003 | Hansen et al. | |
| 6,707,762 B1 | 3/2004 | Goodman et al. | |
| 6,710,600 B1 | 3/2004 | Kopecki et al. | |
| 6,725,705 B1 | 4/2004 | Huebler et al. | |
| 6,734,674 B1 | 5/2004 | Struse | |
| 6,745,136 B2 | 6/2004 | Lam et al. | |
| 6,751,560 B1 | 6/2004 | Tingley et al. | |
| 6,763,730 B1 | 7/2004 | Wray | |
| 6,772,636 B2 | 8/2004 | Lam et al. | |
| 6,772,637 B2 | 8/2004 | Bazarov et al. | |
| 6,772,638 B2 | 8/2004 | Matney et al. | |
| 6,781,369 B2 | 8/2004 | Paulson et al. | |
| 6,782,751 B2 | 8/2004 | Linares et al. | |
| 6,789,427 B2 | 9/2004 | Batzinger et al. | |
| 6,791,318 B2 | 9/2004 | Paulson et al. | |
| 6,799,455 B1 | 10/2004 | Neefeldt et al. | |
| 6,799,466 B2 | 10/2004 | Chinn | |
| 6,813,949 B2 | 11/2004 | Masaniello et al. | |
| 6,813,950 B2 | 11/2004 | Glascock et al. | |
| 6,816,072 B2 | 11/2004 | Zoratti | |
| 6,820,016 B2 | 11/2004 | Brown et al. | |
| 6,822,742 B1 | 11/2004 | Kalayeh et al. | |
| 6,843,131 B2 | 1/2005 | Graff et al. | |
| 6,848,313 B2 | 2/2005 | Krieg et al. | |
| 6,851,319 B2 | 2/2005 | Ziola et al. | |
| 6,889,703 B2 | 5/2005 | Bond | |
| 6,904,818 B2 | 6/2005 | Harthorn et al. | |
| 6,912,472 B2 | 6/2005 | Mizushina et al. | |
| 6,920,792 B2 | 7/2005 | Flora et al. | |
| 6,931,931 B2 | 8/2005 | Graff et al. | |
| 6,935,178 B2 | 8/2005 | Prause | |
| 6,945,113 B2 | 9/2005 | Siverling et al. | |
| 6,957,157 B2 | 10/2005 | Lander | |
| 6,968,727 B2 | 11/2005 | Kwun et al. | |
| 6,978,832 B2 | 12/2005 | Gardner et al. | |
| 7,051,577 B2 | 5/2006 | Komninos | |
| 7,080,557 B2 | 7/2006 | Adnan | |
| 7,109,929 B1 | 9/2006 | Ryken, Jr. | |
| 7,111,516 B2 | 9/2006 | Bazarov et al. | |
| 7,140,253 B2 | 11/2006 | Merki et al. | |
| 7,143,659 B2 | 12/2006 | Stout et al. | |
| 7,171,854 B2 | 2/2007 | Nagashima et al. | |
| 7,231,331 B2 | 6/2007 | Davis | |
| 7,234,355 B2 | 6/2007 | Dewangan et al. | |
| 7,240,574 B2 | 7/2007 | Sapelnikov | |
| 7,255,007 B2 | 8/2007 | Messer et al. | |
| 7,261,002 B1 | 8/2007 | Gysling et al. | |
| 7,266,992 B2 | 9/2007 | Shamout et al. | |
| 7,274,996 B2 | 9/2007 | Lapinski | |
| 7,284,433 B2 | 10/2007 | Ales et al. | |
| 7,293,461 B1 | 11/2007 | Girndt | |
| 7,299,697 B2 | 11/2007 | Siddu et al. | |
| 7,310,877 B2 | 12/2007 | Cao et al. | |
| 7,328,618 B2 | 2/2008 | Hunaidi et al. | |
| 7,331,215 B2 | 2/2008 | Bond | |
| 7,356,444 B2 | 4/2008 | Blemel | |
| 7,360,462 B2 | 4/2008 | Nozaki et al. | |
| 7,373,808 B2 | 5/2008 | Zanker et al. | |
| 7,380,466 B2 | 6/2008 | Deeg | |
| 7,383,721 B2 | 6/2008 | Parsons et al. | |
| 7,392,709 B2 | 7/2008 | Eckert | |
| 7,405,391 B2 | 7/2008 | Ogisu et al. | |
| 7,412,882 B2 | 8/2008 | Lazar et al. | |
| 7,412,890 B1 | 8/2008 | Johnson et al. | |
| 7,414,395 B2 | 8/2008 | Gao et al. | |
| 7,426,879 B2 | 9/2008 | Nozaki et al. | |
| 7,458,267 B2 | 12/2008 | McCoy | |
| 7,475,596 B2 * | 1/2009 | Hunaidi | G01B 17/02 |
| | | | 73/592 |
| 7,493,817 B2 | 2/2009 | Germata | |
| 7,523,666 B2 | 4/2009 | Thompson et al. | |
| 7,526,944 B2 | 5/2009 | Sabata et al. | |
| 7,530,270 B2 | 5/2009 | Nozaki et al. | |
| 7,543,500 B2 | 6/2009 | Litzenberg et al. | |
| 7,554,345 B2 | 6/2009 | Vokey | |
| 7,564,540 B2 | 7/2009 | Paulson | |
| 7,587,942 B2 | 9/2009 | Smith et al. | |
| 7,590,496 B2 | 9/2009 | Blemel | |
| 7,596,458 B2 | 9/2009 | Lander | |
| 7,607,351 B2 | 10/2009 | Allison et al. | |
| 7,623,427 B2 | 11/2009 | Jann et al. | |
| 7,647,829 B2 | 1/2010 | Junker et al. | |
| 7,650,790 B2 | 1/2010 | Wright | |
| 7,657,403 B2 | 2/2010 | Stripf et al. | |
| 7,668,670 B2 | 2/2010 | Lander | |
| 7,680,625 B2 | 3/2010 | Trowbridge et al. | |
| 7,690,258 B2 | 4/2010 | Minagi et al. | |
| 7,694,564 B2 | 4/2010 | Brignac et al. | |
| 7,696,940 B1 | 4/2010 | MacDonald | |
| 7,711,217 B2 | 5/2010 | Takahashi et al. | |
| 7,751,989 B2 | 7/2010 | Owens et al. | |
| 7,810,378 B2 | 10/2010 | Hunaidi et al. | |
| 7,980,317 B1 | 7/2011 | Preta et al. | |
| 8,319,508 B2 | 11/2012 | Vokey | |
| 8,353,309 B1 * | 1/2013 | Embry | A62C 35/20 |
| | | | 137/382 |
| 8,614,745 B1 * | 12/2013 | Al Azemi | H04N 7/183 |
| | | | 348/159 |
| 8,674,830 B2 | 3/2014 | Lanham et al. | |
| 8,823,509 B2 | 9/2014 | Hyland et al. | |
| 8,931,505 B2 * | 1/2015 | Hyland | A62C 35/20 |
| | | | 137/296 |
| 9,291,520 B2 | 3/2016 | Fleury, Jr. et al. | |
| 9,315,973 B2 * | 4/2016 | Varman | F16K 27/12 |
| 9,496,943 B2 * | 11/2016 | Parish | A62C 37/40 |
| 9,528,903 B2 | 12/2016 | Zusman | |
| 9,593,999 B2 | 3/2017 | Fleury | |
| 9,772,250 B2 | 9/2017 | Richarz et al. | |
| 9,780,433 B2 | 10/2017 | Schwengler et al. | |
| 9,799,204 B2 * | 10/2017 | Hyland | H04Q 9/00 |
| 9,849,322 B2 * | 12/2017 | Hyland | A62C 37/50 |
| 9,861,848 B2 * | 1/2018 | Hyland | F17D 5/02 |
| 10,175,135 B2 | 1/2019 | Dintakurt et al. | |
| 10,283,857 B2 | 5/2019 | Ortiz et al. | |
| 10,305,178 B2 | 5/2019 | Gibson et al. | |
| 10,317,384 B2 * | 6/2019 | Morrow | H04W 4/021 |
| 10,386,257 B2 | 8/2019 | Fleury, Jr. et al. | |
| 2001/0045129 A1 | 11/2001 | Williams et al. | |
| 2002/0043549 A1 | 4/2002 | Taylor et al. | |
| 2002/0124633 A1 | 9/2002 | Yang et al. | |
| 2002/0159584 A1 | 10/2002 | Sindalovsky et al. | |
| 2003/0107485 A1 * | 6/2003 | Zoratti | A62C 31/28 |
| | | | 340/568.1 |
| 2004/0173006 A1 | 9/2004 | McCoy et al. | |
| 2005/0005680 A1 | 1/2005 | Anderson | |
| 2005/0067022 A1 | 3/2005 | Istre | |
| 2005/0072214 A1 | 4/2005 | Cooper | |
| 2005/0121880 A1 | 6/2005 | Santangelo | |
| 2005/0279169 A1 | 12/2005 | Lander | |
| 2006/0174707 A1 | 8/2006 | Zhang | |
| 2006/0201550 A1 | 9/2006 | Blyth et al. | |
| 2006/0283251 A1 | 12/2006 | Hunaidi | |
| 2006/0284784 A1 | 12/2006 | Smith et al. | |
| 2007/0044552 A1 | 3/2007 | Huang | |
| 2007/0051187 A1 | 3/2007 | McDearmon | |

(56) References Cited

U.S. PATENT DOCUMENTS

| | | | |
|---|---|---|---|
| 2007/0113618 A1 | 5/2007 | Yokoi et al. | |
| 2007/0130317 A1 | 6/2007 | Lander | |
| 2008/0078567 A1 | 4/2008 | Miller et al. | |
| 2008/0079640 A1 | 4/2008 | Yang | |
| 2008/0168840 A1 | 7/2008 | Seeley et al. | |
| 2008/0189056 A1 | 8/2008 | Heidl et al. | |
| 2008/0281534 A1 | 11/2008 | Hurley | |
| 2008/0307623 A1 | 12/2008 | Furukawa | |
| 2008/0314122 A1 | 12/2008 | Hunaidi | |
| 2009/0044628 A1 | 2/2009 | Lotscher | |
| 2009/0133887 A1 | 5/2009 | Garcia et al. | |
| 2009/0139336 A1* | 6/2009 | Trowbridge, Jr. | F17D 5/00 73/622 |
| 2009/0182099 A1 | 7/2009 | Noro et al. | |
| 2009/0214941 A1 | 8/2009 | Buck et al. | |
| 2009/0278293 A1 | 11/2009 | Yoshinaka et al. | |
| 2009/0301571 A1 | 12/2009 | Ruhs | |
| 2010/0077234 A1 | 3/2010 | Das | |
| 2010/0156632 A1 | 6/2010 | Hyland et al. | |
| 2010/0290201 A1 | 11/2010 | Takeuchi et al. | |
| 2010/0295672 A1 | 11/2010 | Hyland et al. | |
| 2011/0063172 A1 | 3/2011 | Podduturi | |
| 2011/0079402 A1 | 4/2011 | Darby et al. | |
| 2011/0102281 A1 | 5/2011 | Su | |
| 2011/0308638 A1 | 12/2011 | Hyland et al. | |
| 2012/0007743 A1 | 1/2012 | Solomon | |
| 2012/0007744 A1 | 1/2012 | Pal et al. | |
| 2012/0169560 A1 | 7/2012 | Lee et al. | |
| 2012/0296580 A1 | 11/2012 | Barkay | |
| 2012/0324985 A1 | 12/2012 | Gu et al. | |
| 2013/0036796 A1 | 2/2013 | Fleury et al. | |
| 2013/0041601 A1 | 2/2013 | Dintakurti et al. | |
| 2013/0049968 A1 | 2/2013 | Fleury, Jr. | |
| 2013/0145826 A1 | 6/2013 | Richarz et al. | |
| 2013/0229262 A1 | 9/2013 | Bellows | |
| 2013/0321231 A1 | 12/2013 | Flores-Cuadras | |
| 2014/0373941 A1* | 12/2014 | Varman | F16K 27/12 137/296 |
| 2015/0082868 A1 | 3/2015 | Hyland | |
| 2016/0001114 A1 | 1/2016 | Hyland | |
| 2016/0013565 A1 | 1/2016 | Ortiz | |
| 2016/0018283 A1 | 1/2016 | Fleury et al. | |
| 2017/0121949 A1 | 5/2017 | Fleury et al. | |
| 2017/0237158 A1 | 8/2017 | Gibson | |
| 2017/0237165 A1 | 8/2017 | Ortiz et al. | |
| 2018/0080849 A1 | 3/2018 | Showcatally et al. | |
| 2018/0093117 A1* | 4/2018 | Hyland | A62C 35/20 |
| 2018/0224349 A1 | 8/2018 | Fleury, Jr. et al. | |
| 2019/0024352 A1* | 1/2019 | Ozburn | E03B 9/06 |
| 2019/0214717 A1 | 7/2019 | Gibson et al. | |
| 2019/0214718 A1 | 7/2019 | Ortiz et al. | |
| 2019/0316983 A1 | 10/2019 | Fleury, Jr. et al. | |
| 2020/0072697 A1 | 3/2020 | Gibson et al. | |
| 2020/0212549 A1 | 7/2020 | Gibson et al. | |
| 2020/0232863 A1* | 7/2020 | Moreno | G01M 3/3272 |
| 2020/0232864 A1* | 7/2020 | Moreno | G01M 3/3272 |

FOREIGN PATENT DOCUMENTS

| | | |
|---|---|---|
| AU | 2017248541 | 3/2019 |
| CA | 2154433 | 1/1997 |
| CA | 2397174 | 8/2008 |
| CA | 2634739 | 6/2015 |
| CA | 3010333 | 7/2020 |
| CA | 2766850 | 8/2020 |
| CA | 3023529 | 8/2020 |
| CN | 1831478 | 6/2013 |
| DE | 4211038 | 10/1993 |
| DE | 19757581 | 7/1998 |
| EP | 0711986 | 5/1993 |
| EP | 1052492 | 11/2000 |
| EP | 1077370 | 2/2001 |
| EP | 1077371 | 2/2001 |
| FR | 2439990 | 5/1980 |
| FR | 2776065 | 9/1999 |
| GB | 2250820 | 6/1992 |
| GB | 2269900 | 2/1994 |
| GB | 2367362 | 4/2002 |
| GB | 2421311 | 6/2006 |
| JP | 59170739 | 9/1984 |
| JP | 60111132 | 6/1985 |
| JP | 11201859 | 7/1990 |
| JP | 08250777 | 9/1996 |
| JP | H10-2744 | 1/1998 |
| JP | H11210028 | 8/1999 |
| JP | 2000131179 | 5/2000 |
| JP | 2002206965 | 7/2002 |
| JP | 2002310840 | 10/2002 |
| JP | 2005315663 | 11/2005 |
| JP | 2005321935 | 11/2005 |
| JP | 2006062414 | 3/2006 |
| JP | 2006062716 | 3/2006 |
| JP | 2007047139 | 2/2007 |
| JP | 2010068017 | 3/2010 |
| JP | 2013528732 | 7/2013 |
| JP | H5654124 | 11/2014 |
| WO | 9850771 | 11/1998 |
| WO | 0151904 | 7/2001 |
| WO | 03049528 | 6/2003 |
| WO | 2004073115 | 8/2004 |
| WO | 2009057214 | 5/2009 |
| WO | 2010135587 | 11/2010 |
| WO | 2011021039 | 2/2011 |
| WO | 2011058561 | 5/2011 |
| WO | 2011159403 | 12/2011 |
| WO | 2012000088 | 1/2012 |
| WO | 2012153147 | 11/2012 |
| WO | 2013025526 | 2/2013 |
| WO | 2014016625 | 1/2014 |
| WO | 2017139029 | 8/2017 |
| WO | 2017139030 | 8/2017 |
| WO | 2020050946 | 3/2020 |

OTHER PUBLICATIONS

Gibson, Daryl Lee; Extended European Search Report for 16890115.5, filed Dec. 20, 2016, dated Jan. 24, 2020, 10 pgs.

Hyland, Gregory E., Non-Final Office Action for U.S. Appl. No. 13/101,235, filed May 5, 2011, dated Jul. 31, 2013; 57 pgs.

Hyland, Gregory E.; Final Office Action for U.S. Appl. No. 13/101,235, filed May 5, 2011, dated Feb. 20, 2014; 29 pgs.

Hyland, Gregory E.; Issue Notification for U.S. Appl. No. 13/101,235, filed May 5, 2011, dated Dec. 23, 2014, 1 pg.

Hyland, Gregory E.; Non-Final Office Action for U.S. Appl. No. 13/101,235, filed May 5, 2011, dated Jun. 5, 2014, 29 pgs.

Hyland, Gregory E.; Notice of Allowance for U.S. Appl. No. 13/101,235, filed May 5, 2011, dated Sep. 11, 2014, 11 pgs.

Hyland, Gregory E.; Supplemental Notice of Allowability for U.S. Appl. No. 13/101,235, filed May 5, 2011, dated Nov. 25, 2014, 5 pgs.

Hyland, Gregory E.; Applicant-Initiated Interview Summary for U.S. Appl. No. 14/557,754, filed Dec. 2, 2014, dated Apr. 19, 2017, 4 pgs.

Hyland, Gregory E.; Final Office Action for U.S. Appl. No. 14/557,754, filed Dec. 2, 2014, dated Apr. 5, 2017, 23 pgs.

Hyland, Gregory E.; Final Office Action for U.S. Appl. No. 14/557,754, filed Dec. 2, 2014, dated Mar. 30, 2016, 24 pgs.

Hyland, Gregory E.; Non-Final Office Action for U.S. Appl. No. 14/557,754, filed Dec. 2, 2014, dated Jan. 19, 2016, 101 pgs.

Hyland, Gregory E.; Non-Final Office Action for U.S. Appl. No. 14/557,754, filed Dec. 2, 2014, dated Nov. 8, 2016, 48 pgs.

Hyland, Gregory E.; Notice of Allowance for U.S. Appl. No. 14/557,754, filed Dec. 2, 2014, dated Jul. 17, 2017, 14 pgs.

Hyland, Gregory E.; Notice of Decision from Post-Prosecution Pilot Program (P3) Conference for U.S. Appl. No. 14/557,754, filed Dec. 2, 2014, dated Sep. 14, 2016, 4 pgs.

Hyland, Gregory E.; Supplemental Notice of Allowability for U.S. Appl. No. 14/557,754, filed Dec. 2, 2014, dated Oct. 20, 2017, 11 pgs.

(56) References Cited

OTHER PUBLICATIONS

Hyland, Gregory; Issue Notification for U.S. Appl. No. 14/557,754, filed Dec. 2, 2014, dated Dec. 20, 2017, 1 pg.
Hyland, Gregory E.; Final Office Action for U.S. Appl. No. 14/848,676, filed Sep. 9, 2015, dated Aug. 19, 2016; 20 pgs.
Hyland, Gregory E.; Non-Final Office Action for U.S. Appl. No. 14/848,676, filed Sep. 9, 2015, dated Dec. 13, 2016, 52 pgs.
Hyland, Gregory E.; Notice of Allowance for U.S. Appl. No. 14/848,676, filed Sep. 9, 2015, dated Sep. 6, 2017, 12 pgs.
Hyland, Gregory E.; Supplemental Notice of Allowability for U.S. Appl. No. 14/848,676, filed Sep. 9, 2015, dated Nov. 27, 2017, 6 pgs.
Hyland, Gregory E.; Supplemental Notice of Allowability for U.S. Appl. No. 14/848,676, filed Sep. 9, 2015, dated Sep. 19, 2017, 8 pgs.
Hyland, Gregory; Final Office Action for U.S. Appl. No. 14/848,676, filed Sep. 9, 2015, dated Jun. 7, 2017, 25 pgs.
Hyland, Gregory; Non-Final Office Action for U.S. Appl. No. 14/848,676, filed Sep. 9, 2015, dated Mar. 4, 2016, 94 pgs.
Hyland, Gregory E.; Non-Final Office Action for U.S. Appl. No. 15/817,172, filed Nov. 18, 2017, dated Dec. 17, 2019, 23 pgs.
Hyland, Gregory E.; Non-Final Office Action for U.S. Appl. No. 15/817,172, filed Nov. 18, 2017, dated Jul. 10, 2019, 74 pgs.
Fleury Jr., Leo W.; Non-Final Office Action for U.S. Appl. No. 13/492,790, filed Jun. 8, 2012, dated Nov. 5, 2014, 30 pgs.
Fleury, Jr., Leo W.; Advisory Action for U.S. Appl. No. 13/492,790, filed Jun. 8, 2012, dated Jul. 9, 2014, 3 pgs.
Fleury, Jr., Leo W.; Final Office Action for U.S. Appl. No. 13/492,790, filed Jun. 8, 2012, dated Mar. 12, 2014; 19 pgs.
Fleury, Jr., Leo W.; Issue Notification for U.S. Appl. No. 13/492,790, filed Jun. 8, 2012, dated Mar. 2, 2016, 1 pg.
Fleury, Jr., Leo W.; Non-Final Office Action for U.S. Appl. No. 13/492,790, filed Jun. 8, 2012, dated Sep. 12, 2013; 37 pgs.
Fleury, Jr., Leo W.; Notice of Allowance for U.S. Appl. No. 13/492,790, filed Jun. 8, 2012, dated Feb. 2, 2016, 9 pgs.
Fleury, Jr., Leo W.; Notice of Allowance for U.S. Appl. No. 13/492,790, filed Jun. 8, 2012, dated May 12, 2015, 9 pgs.
Fleury, Jr., Leo W.; Notice of Allowance for U.S. Appl. No. 13/492,790, filed Jun. 8, 2012, dated Sep. 23, 2015, 11 pgs.
Fleury, Leo W.; Applicant-Initiated Interview Summary for U.S. Appl. No. 14/870,070, filed Sep. 30, 2015, dated Feb. 28, 2018, 4 pgs.
Fleury, Leo W.; Final Office Action for U.S. Appl. No. 14/870,070, filed Sep. 30, 2015, dated Dec. 29, 2017, 24 pgs.
Fleury, Leo; Non-Final Office Action for U.S. Appl. No. 14/870,070, filed Sep. 30, 2015, dated Jun. 21, 2017, 88 pgs.
Fleury, Jr., Leo W.; Non-Final Office Action for U.S. Appl. No. 15/939,942, filed Mar. 29, 2018, dated Sep. 25, 2019, 92 pgs.
Richarz, Werner Guenther; Corrected Notice of Allowability for U.S. Appl. No. 13/492,792, filed Jun. 8, 2012, dated Aug. 29, 2017, 6 pgs.
Richarz, Werner Guenther; Final Office Action for U.S. Appl. No. 13/492,792, filed Jun. 8, 2012, dated Oct. 20, 2014, 17 pgs.
Richarz, Werner Guenther; Final Office Action for U.S. Appl. No. 13/492,792, filed Jun. 8, 2012, dated Sep. 10, 2015, 20 pgs.
Richarz, Werner Guenther; Final Office Action for U.S. Appl. No. 13/492,792, filed Jun. 8, 2012, dated Sep. 8, 2016, 36 pgs.
Richarz, Werner Guenther; Issue Notification for U.S. Appl. No. 13/492,792, filed Jun. 8, 2012, dated Sep. 6, 2017, 1 pg.
Richarz, Werner Guenther; Non-Final Office Action for U.S. Appl. No. 13/492,792, filed Jun. 8, 2012, dated Nov. 6, 2013, 39 pgs.
Richarz, Werner Guenther; Non-Final Office Action for U.S. Appl. No. 13/492,792, filed Jun. 8, 2012, dated Jun. 4, 2014, 24 pgs.
Richarz, Werner Guenther; Non-Final Office Action for U.S. Appl. No. 13/492,792, filed Jun. 8, 2012, dated Feb. 27, 2015, 15 pgs.
Richarz, Werner Guenther; Non-Final Office Action for U.S. Appl. No. 13/492,792, filed Jun. 8, 2012, dated Mar. 8, 2016, 27 pgs.
Richarz, Werner Guenther; Notice of Allowance for U.S. Appl. No. 13/492,792, filed Jun. 8, 2012, dated Jun. 13, 2017, 31 pgs.
Richarz, Werner Guenther; Restriction Requirement for U.S. Appl. No. 13/492,792, filed Jun. 8, 2012, dated Sep. 27, 2013; 5 pgs.
Chou, et al.; Article entitled: "Non-invasive Acceleration-based Methodology for Damage Detection and Assessment of Water Distribution System", Mar. 2010, 17 pgs.
Dintakurti, Ganapathi Deva Varma; Corrected Notice of Allowance for U.S. Appl. No. 13/492,794, filed Jun. 8, 2012, dated Dec. 6, 2018, 6 pgs.
Dintakurti, Ganapathi Deva Varma; Final Office Action for U.S. Appl. No. 13/492,794, filed Jun. 8, 2012, dated Oct. 18, 2017, 38 pgs.
Fleury, Jr., Leo W.; Final Office Action for U.S. Appl. No. 15/939,942, filed Mar. 29, 2018, dated Feb. 19, 2020, 29 pgs.
Gibson, Daryl Lee; Office Action for Canadian patent application No. 3,010,345, filed Dec. 20, 2016, dated Dec. 16, 2019, 4 pgs.
Gibson, Daryl Lee; International Search Report and Written Opinion for PCT Application No. PCT/US19/45451, filed Aug. 7, 2019, dated Feb. 3, 2020, 11 pgs.
Gibson, Daryl Lee; Office Action for Canadian application No. 3,057,202, filed Oct. 1, 2019, dated Dec. 19, 2019, 3 pgs.
Fleury, Leo W.; International Search Report and Written Opinion for serial No. PCT/US12/50390 filed Aug. 10, 2012, dated Dec. 17, 2012, 18 pgs.
Fleury, Leo W.; International Preliminary Report on Patentability for serial No. PCT/US12/50390 filed Aug. 10, 2012, dated Feb. 18, 2014, 14 pgs.
Fleury, et al.; Supplemental European Search Report for application No. 12823594.2, filed Aug. 20, 2012, dated Feb. 18, 2015, 6 pgs.
Fleury Jr., Leo W.; European Search Report for serial No. 12823594, filed Aug. 10, 2012, dated Jun. 8, 2015, 11 pgs.
Fleury Jr., Leo W.; European Search Report for Serial No. 12823594, filed Aug. 10, 2012, dated May 10, 2017, 4 pgs.
Fleury Jr., Leo W.; European Search Report for Serial No. 12823594, filed Aug. 10, 2012, dated Dec. 21, 2017, 4 pgs.
Fleury, Leo W.; Office Action for Canadian application No. 2,842,042, filed Aug. 10, 2012, dated Apr. 24, 2018, 3 pgs.
Fleury, Leo W.; Office Action for Canadian application No. 2,842,042, filed Aug. 10, 2012, dated Feb. 28, 2019, 3 pgs.
Fleury, Leo W.; Office Action for Canadian patent application No. 2,842,042, filed Aug. 10, 2012, dated Dec. 5, 82019, 3 pgs.
Hyland; U.S. Provisional Patent Application entitled: Infrastructure Monitoring Devices, Systems, and Methods, having U.S. Appl. No. 61/355,468, filed Jun. 16, 2010.
Fleury, Leo W., U.S. Provisional Patent Application Entitled: Hydrant Leak Detector Communication Device, System, and Method under U.S. Appl. No. 61/523,274, filed Aug. 12, 2011; 35 pgs.
Hunaidi, Osama; Non-Final Office Action for U.S. Appl. No. 11/766,288, filed Jun. 21, 2007, dated Jan. 20, 2010, 50 pgs.
Hunaidi, Osama; Notice of Allowance for U.S. Appl. No. 11/766,288, filed Jun. 21, 2007, dated Jun. 24, 2010, 8 pgs.
Hunaidi, Osama; Issue Notification for U.S. Appl. No. 11/766,288, filed Jun. 21, 2007, dated Sep. 22, 2010, 1 pg.
Hunaidi, Osama; Non-final Office Action for U.S. Appl. No. 09/482,317, filed Jan. 14, 2000, dated Dec. 17, 2001, 6 pgs.
Hunaidi, Osama; Notice of Allowance for U.S. Appl. No. 09/482,317, filed Jan. 14, 2000, dated May 13, 2002, 4 pgs.
Peter, Russo Anthony; European Search Report for Patent Application No. EP95307807, filed Nov. 1, 1995, dated Jul. 22, 1998, 5 pgs.
Ortiz, Jorge Isaac; Non-Final Office Action for U.S. Appl. No. 15/043,057, filed Feb. 12, 2016, dated Jun. 4, 2018, 94 pgs.
Ortiz, Jorge Isaac; Final Office Action for U.S. Appl. No. 15/043,057, filed Feb. 12, 2016, dated Dec. 12, 2018, 25 pgs.
Ortiz, Jorge Isaac; Notice of Allowance for U.S. Appl. No. 15/043,057, filed Feb. 12, 2016, dated Feb. 19, 2019, 8 pgs.
Ortiz, Jorge Isaac; Issue Notification for U.S. Appl. No. 15/043,057, filed Feb. 12, 2016, dated Apr. 17, 2019, 1 pg.
Ortiz, Jorge Isaac; Supplemental Notice of Allowance for U.S. Appl. No. 15/043,057, filed Feb. 12, 2016, dated Mar. 13, 2019, 6 pgs.
Ortiz, Jorge; International Search Report and Written Opinion for PCT/US16/67689, filed Dec. 20, 2016, dated Mar. 8, 2017, 9 pgs.
Ortiz, Jorge Isaac; International Preliminary Report on Patentability for PCT Application No. PCT/US2016/067689, filed Dec. 20, 2016, dated Aug. 23, 2018, 8 pgs.

(56) References Cited

OTHER PUBLICATIONS

Ortiz, Jorge Isaac; Extended European Search Report for serial No. 16890114.8, filed Dec. 20, 2016, dated Sep. 26, 2019, 11 pgs.
Ortiz, Jorge Isaac; Office Action for Canadian patent application No. 3,010,333, filed Dec. 20, 2016, dated Dec. 6, 2019, 4 pgs.
Gibson, Daryl Lee; Non-Final Office Action for U.S. Appl. No. 15/255,795, filed Sep. 2, 2016, dated Feb. 23, 2018, 86 pgs.
Gibson, Daryl Lee; Final Office Action for U.S. Appl. No. 15/255,795, filed Sep. 2, 2016, dated Aug. 31, 2018, 33 pgs.
Gibson, Daryl Lee; Notice of Allowance for U.S. Appl. No. 15/255,795, filed Sep. 2, 2016, dated Jan. 17, 2019, 17 pgs.
Gibson, Daryl Lee; Corrected Notice of Allowance for U.S. Appl. No. 15/255,795, filed Sep. 2, 2016, dated Mar. 21, 2019, 6 pgs.
Gibson, Daryl Lee; International Search Report and Written Opinion for PCT Application No. PCT/US2016/067692, filed Dec. 20, 2016, dated Mar. 2, 2017,10 pgs.
Gibson, Daryl Lee; International Preliminary Report on Patentability for PCT Application No. PCT/US2016/067692, filed Dec. 20, 2016, dated Aug. 23, 2018, 9 pgs.
Gibson, Daryl Lee; Invitation to Pay Additional Fees for PCT/US19/45451, filed Aug. 7, 2019, dated Oct. 10, 2019, 2 pgs.
Gibson, Daryl Lee; Office Action for Canadian patent application No. 3,057,167, filed Aug. 7, 2019, dated Nov. 19, 2019, 7 pgs.
Gibson, Daryl Lee; U.S. Provisional Application entitled: Nozzle Cap Multi-Band Antenna Assembly having U.S. Appl. No. 62/294,973, filed Feb. 12, 2016, 54 pgs.
Antenna. Merriam-Webster Dictionary, 2014 [retrieved on Jun. 1, 2014]. Retrieved from the Internet: <URL: www.merriam-webster.com/dictionary/antenna>.
Hyland, Gregory E.; Issue Notification for U.S. Appl. No. 14/848,676, filed Sep. 9, 2015, dated Dec. 6, 2017, 1 pg.
J.A. Gallego-Juarez, G. Rodriguez-Corral and L. Gaete-Garreton, An ultrasonic transducer for high power applications in gases, Nov. 1978, Ultrasonics, published by IPC Business Press, p. 267-271.
"Non-Patent Literature Murata (entitled ""Piezoelectric Sounds Components""), accessed at http://web.archive.org/web/20030806141815/http://www.murata.com/catalog/p37e17.pdf, archived on Aug. 6, 2003."
"Non-Patent Literature NerdKits, accessed at http://web.archive.org/web/20090510051850/http://www.nerdkits.com/videos/sound_meter/, archived on May 10, 2009."
"Non-Patent Literature Bimorph (entitled ""Bimoprh actuators""), accessed at http://web.archive.org/web/20080122050424/http://www.elpapiezo.ru/eng/curve_e.shtml, archived on Jan. 22, 2008."
Dintakurti, Ganapathi Deva Varma; Non-Final Office Action for U.S. Appl. No. 13/492,794, filed Jun. 8, 2012, dated Jan. 16, 2015, 60 pgs.
Dintakurti, Ganapathi Deva Varma; Non-Final Office Action for U.S. Appl. No. 13/492,794, filed Jun. 8, 2012, dated May 17, 2016, 48 pgs.
Dintakurti, Ganapathi Deva Varma; Final Office Action for U.S. Appl. No. 13/492,794, filed Jun. 8, 2012, dated Nov. 8, 2016, 31 pgs.
Dintakurti, Ganapathi Deva Varma; Non-Final Office Action for U.S. Appl. No. 13/492,794, filed Jun. 8, 2012, dated Mar. 16, 2017, 30 pgs.
Dintakurti, Ganapathi Deva Varma; Non-Final Office Action for U.S. Appl. No. 13/492,794, filed Jun. 8, 2012, dated Jan. 11, 2018, 38 pgs.
Dintakurti, Ganapathi Deva Varma; Final Office Action for U.S. Appl. No. 13/492,794, filed Jun. 8, 2012, dated Jun. 22, 2018, 39 pgs.
Dintakurti, Ganapathi Deva Varma; Notice of Allowance for U.S. Appl. No. 13/492,794, filed Jun. 8, 2012, dated Sep. 24, 2018, 21 pgs.
Dintakurti, Ganapathi Deva Varma; Issue Notification for U.S. Appl. No. 13/492,794, filed Jun. 8, 2012, dated Dec. 19, 2018, 1 pg.
Fleury Jr, Leo W.; Non-Final Office Action for U.S. Appl. No. 13/492,795, filed Jun. 8, 2012, dated Sep. 23, 2013; 35 pgs.
Fleury, Jr., Leo W.; Final Office Action for U.S. Appl. No. 13/492,795, filed Jun. 8, 2012, dated Apr. 23, 2014, 19 pgs.
Fleury, Jr., Leo W.; Advisory Action for U.S. Appl. No. 13/492,795, filed Jun. 8, 2012, dated Jun. 18, 2014, 4 pgs.
Fleury, Jr., Leo W.; Non-Final Office Action for U.S. Appl. No. 13/492,795, filed Jun. 8, 2012, dated Oct. 21, 2014, 37 pgs.
Fleury, Jr., Leo W.; Final Office Action for U.S. Appl. No. 13/492,795, filed Jun. 8, 2012, dated May 22, 2015, 28 pgs.
Non-Patent Literature "Radiodetection Water Leak Detection Products", 2008, Radiodetection Ltd.—SPX Corporation.
Fleury, Jr., Leo W.; Advisory Action for U.S. Appl. No. 13/492,795, filed Jun. 8, 2012, dated Sep. 9, 2015, 3 pgs.
Fleury, Jr., Leo W.; Non-Final Office Action for U.S. Appl. No. 13/492,795, filed Jun. 8, 2012, dated Mar. 1, 2016, 42 pgs.
Fleury, Jr., Leo W.; Notice of Allowance for U.S. Appl. No. 13/492,795, filed Jun. 8, 2012, dated Sep. 21, 2016, 18 pgs.
Fleury, Jr., Leo W.; Notice of Allowability for U.S. Appl. No. 13/492,795, filed Jun. 8, 2012, dated Oct. 24, 2016, 13 pgs.
Fleury, Jr., Leo W.; Supplemental Notice of Allowance for U.S. Appl. No. 13/492,795, filed Jun. 8, 2012, dated Nov. 22, 2016; 8 pgs.
Fleury, Jr., Leo W.; Corrected Notice of Allowability for U.S. Appl. No. 13/492,795, filed Jun. 8, 2012, dated Feb. 14, 2017; 8 pgs.
Fleury, Jr., Leo W.; Issue Notification for U.S. Appl. No. 13/492,795, filed Jun. 8, 2012, dated Feb. 22, 2017; 1 page.
Fleury, Jr., Leo W.; Notice of Allowance for U.S. Appl. No. 15/401,457, filed Jan. 9, 2017, dated Apr. 16, 2019, 88 pgs.
Fleury, Jr., Leo W.; Corrected Notice of Allowance for U.S. Appl. No. 15/401,457, filed Jan. 9, 2017, dated Jun. 26, 2019, 55 pgs.
Hyland; International Search Report and Written Opinion for serial No. PCT/US2011/035374, filed May 5, 2011, dated Sep. 13, 2011; 7 pgs.
Hyland; International Preliminary Report on Patentability for serial No. PCT/US2011/035374, filed May 5, 2011, dated Dec. 19, 2012; 5 pgs.
Hyland, Gregory E..; Office Action for Canadian Patent Application No. 2,766,850, filed May 5, 2011, dated Mar. 13, 2017, 4 pgs.
Hyland, Gregory E.; Office Action for Canadian application No. 2,766,850, filed May 5, 2011, dated Aug. 16, 2018, 4 pgs.
Hyland, Gregory E.; Office Action for Canadian patent application No. 2,766,850, filed May 5, 2011, dated Jun. 19, 2019, 4 pgs.
Hyland, Gregory E.; Mexico Office Action for serial No. MX/a/2012/000347, filed May 5, 2011, dated May 30, 2016, 4 pgs.
Hyland, Gregory E.; Mexico Office Action for serial No. MX/a/2012/000347, filed May 5, 2011, dated Aug. 31, 2016, 4 pgs.
Hyland, Gregory E.; Mexico Office Action for serial No. MX/a/2012/000347, filed May 5, 2011, dated Dec. 13, 2016, 5 pgs.
Hyland, Gregory; Extended European Search Report for serial No. 11796120.1, filed May 5, 2011, dated Nov. 4, 2016, 8 pgs.
Hyland, Gregory E.; Office Action for European patent application No. 11796120.1, filed May 5, 2011, dated Feb. 9, 2018, 4 pgs.
Hyland, Gregory E.; Australian Patent Examination Report for serial No. 2011265675, filed Jan. 21, 2012, dated Oct. 1, 2014, 3 pgs.
Hyland, Gregory E.; Japanese Office Action for serial No. 2013515338, filed Jan. 30, 2012, dated Jun. 10, 2014, 8 pgs.
Hyland, Gregory E.; Japanese Office Action for serial No. 2014-234642, filed May 5, 2011, dated Jul. 7, 2015, 9 pgs.
Hyland, Gregory E.; Japanese Office Action for serial No. 2014-234642, filed May 5, 2011, dated Nov. 4, 2015,9 pgs.
Hyland, Gregory E.; Australian Examination Report for serial No. 2015202550, filed May 5, 2011, dated Aug. 12, 2016, 4 pgs.
Hyland, Gregory E.; Australian Examination Report for serial No. 2015202550, filed May 5, 2011, dated Feb. 9, 2017, 4 pgs.
Hyland, Gregory E.; Australian Examination Report for Serial No. 2015202550, filed May 5, 2011, dated May 16, 2017, 5 pgs.
Hyland, Gregory E.; Australian Examination Report for Serial No. 2015202550, filed May 5, 2011, dated Jul. 5, 2017, 4 pgs.
Hyland, Gregory E.; Office Action for Mexico Patent Application No. MX/a/2017/006090, filed May 5, 2011, dated Sep. 26, 2018, 4 pgs.

(56) References Cited

OTHER PUBLICATIONS

Hyland, Gregory E.; Examination Report for Australian patent application No. 2017248541, filed Oct. 20, 2017, dated Apr. 20, 2018, 5 pgs.
Hyland, Gregory E.; Office Action for Canadian patent application No. 3,023,529, filed May 5, 2011, dated Nov. 26, 2019, 4 pgs.
Hyland, Gregory E.; Final Office Action for U.S. Appl. No. 15/817,172, filed Nov. 18, 2017, dated Jun. 11, 2020, 33 pgs.
Fleury, Jr., Leo W.; Non-Final Office Action for U.S. Appl. No. 15/939,942, filed Mar. 29, 2018, dated May 27, 2020, 23 pgs.
Keefe, Robert Paul, Office Action for Canadian application No. 3,060,512, filed May 5, 2011, dated Apr. 22, 2020, 5 pgs.
Gibson, Daryl Lee; Requirement for Restriction/Election for U.S. Appl. No. 16/121,136, filed Sep. 14, 2018, dated May 7, 2020, 5 pgs.
Gibson, Daryl Lee; Office Action for Canadian patent application No. 3,057,167, filed Aug. 7, 2019, dated May 25, 2020, 3 pgs.
Gibson, Daryl Lee; Office Action for Canadian application No. 3,057,202, filed Oct. 1, 2019, dated Apr. 2, 2020, 4 pgs.
Gibson, Daryl Lee; Non-Final Office Action for U.S. Appl. No. 16/121,136, filed Sep. 4, 2018, dated Jun. 22, 2020, 94 pgs.
Hyland, Gregory E.; Notice of Allowance for U.S. Appl. No. 15/817,172, filed Nov. 18, 2017, dated Aug. 21, 2020, 9 pgs.
Hyland, Gregory E.; Supplemental Notice of Allowance for U.S. Appl. No. 15/817,172, filed Nov. 18, 2017, dated Oct. 28, 2020, 4 pgs.
Hyland, Gregory; Supplemental Notice of Allowance for U.S. Appl. No. 15/817,172, filed Nov. 18, 2017, dated Oct. 9, 2020, 4 pgs.
Gibson, Daryl Lee; Notice of Allowance for U.S. Appl. No. 16/121,136, filed Sep. 4, 2018, dated Sep. 29, 2020 15 pgs.

\* cited by examiner

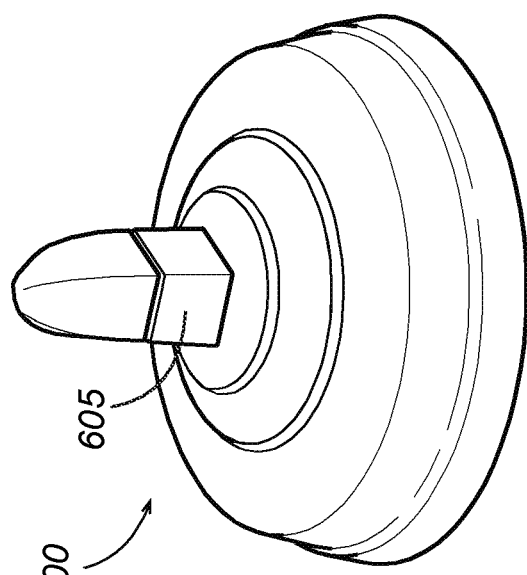
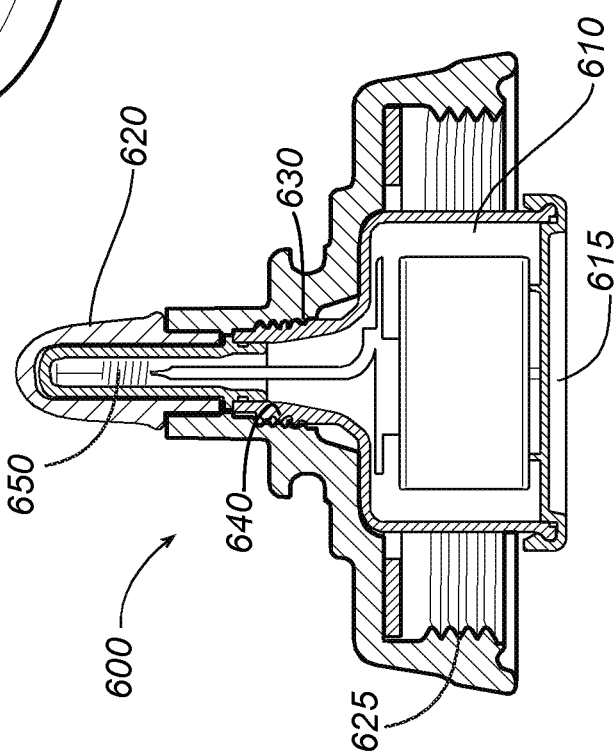
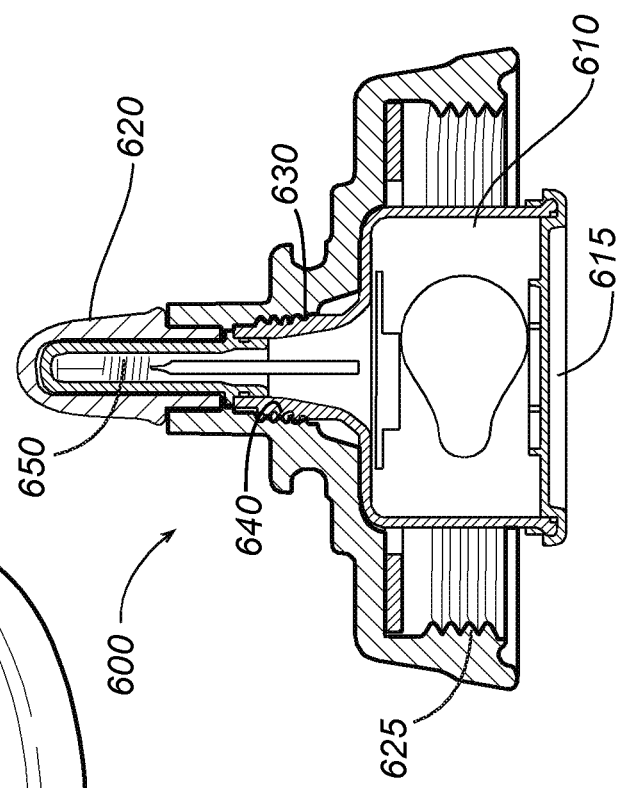

INFRASTRUCTURE MONITORING DEVICES, SYSTEMS, AND METHODS

CROSS-REFERENCE TO RELATED APPLICATIONS

This application is continuation of U.S. application Ser. No. 15/817,172, filed Nov. 18, 2017, which is a continuation of U.S. application Ser. No. 14/848,676, filed Sep. 9, 2015, which issued as U.S. Pat. No. 9,849,322 on Dec. 26, 2017, which is a continuation of U.S. application Ser. No. 14/557,754, filed Dec. 2, 2014, which issued as U.S. Pat. No. 9,861,848 on Jan. 9, 2018, which is a continuation of U.S. application Ser. No. 13/101,235, filed May 5, 2011, which issued as U.S. Pat. No. 8,931,505 on Jan. 13, 2015, which claims the benefit of U.S. Provisional Application No. 61/355,468 filed Jun. 16, 2010, all of which are hereby specifically incorporated by reference herein in their entireties.

FIELD

The disclosure is directed to devices, systems, and methods related to monitoring and controlling an infrastructure such as, but not limited to, the supply and use of commercial, industrial or residential water, gas and/or electric utilities, and, in particular, to devices, methods, and systems for monitoring and controlling a municipality and alerting a user to potential faults and actions required.

BACKGROUND

Municipalities administer and/or outsource numerous utility and safety systems within each municipality. Such systems are usually complex infrastructures and include but are not limited to water distribution, gas distribution, electricity distribution, waste management, traffic control, fire departments, police departments, and emergency response departments. Each of these systems needs to be monitored for use (authorized or unauthorized), faults, tampering, events, interruptions or blockages, leaks, contamination, and/or other issues.

To obtain an understanding of the state of any one system, or for ordinary use, billing or repair purposes, personnel must typically be sent into the municipality to check for problems within the system manually. This process is slow, is labor-intensive, and can lead to overlooked problems. Furthermore, preferred aspects of the system may be evaluated irregularly or infrequently, thereby allowing a problem to go unchecked for long periods of time. By way of example, a leak in a water main may cost a water company a significant amount of money in lost water, energy usage, and chemical treatment, particularly if the leak is not discovered for a relatively long period of time. Furthermore, a leak can lead to underground structural erosion. Interference with a system may go unnoticed unless it is reported to a central location.

Another problem and disadvantage associated with current systems is the lack of property rights sufficient to maintain a network of monitors and device controllers capable of creating a transmission infrastructure that can adapt to multiple monitors and controllers and form an information network for providing information about the system to the utility monitoring the network. For example, some networks require that new poles or towers be erected for placement of the communication devices. Municipalities may have to rent space on a utility company's poles for placement of such devices.

Furthermore, an issue in one system may cause an issue in another system. For example, a fire reported to the fire department may require the gas company to turn off gas flow to the vicinity of the fire and may require the water company to redirect water or additional water pressure to the vicinity. However, many current systems are not interoperable.

It is, therefore, desirable to have a single system that can monitor different aspects of at least one municipality system continuously and communicate with several entities at the same time.

SUMMARY

The disclosed methods, systems, and devices overcome the problems and disadvantages associated with current strategies and systems and provides new systems and methods of monitoring municipality infrastructure.

One embodiment is directed to an infrastructure monitoring system. The system includes an operations center and two or more communications devices communicatively coupled to the operations center. At least one communications device of the plurality of communications devices is coupled to a component of the infrastructure, and at least two communications devices are monitoring devices. The first monitoring device monitors a first aspect or location of the infrastructure and the second monitoring device monitors a second aspect or location of the infrastructure.

In one embodiment each monitoring device includes at least one sensor sensing at least one condition within the infrastructure, at least one data storage device storing data sensed by the at least one sensor, at least one transceiver device adapted to transmit and receive data, and at least one processor communicatively coupled to at least one sensor, data storage device, and transceiver device.

In one embodiment, the operations center and the plurality of communications devices are wirelessly communicatively coupled. At least one communications device is an output device. The output device includes a transceiver device adapted to receive or to transmit data, at least one output port, and a processor communicatively coupled to at least one of the transceiver device and at least one output port.

In one embodiment, the operations center and at least one output device are wirelessly communicatively coupled. Each communications device is adapted to receive transmissions for a second communications device and to retransmit the transmission to the second communications device. Each communications device is adapted to receive transmissions for the operations center and to retransmit the transmission to the operations center.

In one embodiment, at least one output device is coupled to at least one of an actuator control device, an alarm, a Radio-Frequency Identification device and a tamper prevention device.

In one embodiment, a monitoring device and an output device are contained within the same unit. The monitoring device and the output device share at least one of a power source, a transceiver device, and a processor.

The infrastructure can be at least one of a water distribution system, an electricity distribution system, a gas distribution system, a traffic control system, and an emergency response system. The system can monitor for at least one of use of gas, use of water, use of electricity, tampering, leaks, GPS location, proximity, tilt, smoke, temperature, rust, corrosion, fluid flow, pressure, water quality, air quality, contamination, radiation, pH, infrastructure status, and motion.

In one embodiment, the system produces an alert when at least one monitoring device registers an event. In one embodiment, at least one monitoring device is coupled to a visual or acoustical device. The operations center may include multiple operations centers. Each operations center is uniquely located. The operations center can monitor a plurality of infrastructures concurrently.

The plurality of infrastructures are selected from the group consisting of water systems, electrical systems, gas systems, emergency response systems, traffic control systems, and combinations thereof. A component of the infrastructure is one of a fire hydrant, a utility meter, a manhole cover, a utility pole, a valve, a pipe, a traffic light, water tower, water tank, valve box, valve box cover, meter box, meter box cover, and a smoke detector. In various embodiments where the component of the infrastructure is a fire hydrant, the communications device coupled to the fire hydrant is a repeater. At least one portion of the fire hydrant can be comprised of a material that does not interfere with the communications of the communications device. Moreover, the communications device coupled to the fire hydrant may be positioned within one of a nozzle cap, a pumper nozzle, a hose nozzle, a fire truck hookup, and a bonnet.

Another embodiment is directed to another infrastructure monitoring system. The system includes an operations center and a plurality of communications devices communicatively coupled to the operations center. At least one communications device of the plurality of communications devices is coupled to a fire hydrant, a valve, a valve box, a valve box cover, a meter, a meter box, a meter box cover, a water tower, a water tank, a pumper nozzle, a hose nozzle, or a manhole cover.

In one embodiment, the communications device coupled to the fire hydrant is one of a monitoring device, an output device, and a repeater. At least one portion of the fire hydrant is comprised of a material that does not interfere with the communications. In one embodiment, the communications device coupled to the fire hydrant is positioned within one of the nozzle cap, the pumper nozzle, the hose nozzle, the fire truck hookup, and the bonnet.

Another embodiment is directed to a fire hydrant. The fire hydrant includes a bonnet and a communications device coupled to the bonnet. The communications device is an element of an infrastructure monitoring system.

In another embodiment, an infrastructure monitoring assembly can comprise a fire hydrant; a pipe connected in fluid communication with the fire hydrant, a fluid at least partially filling the pipe; a sensor positioned contacting the fluid, the sensor configured to measure a parameter of the fluid; and a processor connected in communication with the sensor, the processor configured to receive a signal from the sensor.

In another embodiment, a method for monitoring an infrastructure network can comprise positioning a sensor in contact with a fluid, the fluid at least partially filling a pipe of the infrastructure network, the pipe connected in fluid communication with a fire hydrant of the infrastructure network; measuring a parameter of the fluid with the sensor; receiving a signal from the sensor with a processor, the signal conveying information about the parameter; and transmitting the information from an antenna to an operation center, the antenna connected in wireless communication with the operation center, the antenna connected in electrical communication with the processor.

In another embodiment, an infrastructure monitoring system can comprise an infrastructure network comprising a fire hydrant and a pipe, the pipe connected in fluid communication with the fire hydrant, the pipe at least partially filled with a fluid; a monitoring device comprising a sensor, a processor, and an antenna, the processor connected in communication with the sensor and the antenna, the sensor positioned in contact with the fluid; and an operation center connected in communication with the monitoring device.

Other embodiments and advantages are set forth in part in the description, which follows, and in part, may be obvious from this description, or may be learned from practice.

DESCRIPTION OF THE DRAWINGS

The figures shown and described in greater detail are provided by way of example only.

FIG. 6A is a perspective view of one embodiment of a nozzle cap for attachment to a fire hydrant.

FIG. 6B is a sectional view of one embodiment of the nozzle cap of FIG. 6A.

FIG. 6C is a sectional view of one embodiment of the nozzle cap of FIG. 6A.

DESCRIPTION

Figure 1:
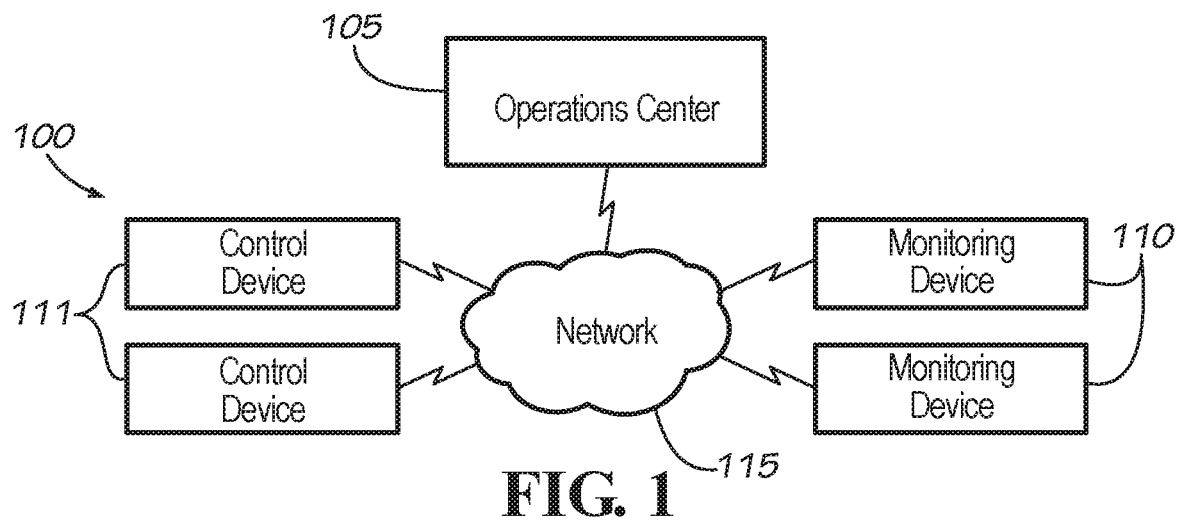
FIG. 1 is a schematic of one embodiment of the disclosed system.

As embodied and broadly described herein, the disclosures herein provide exemplary embodiments of the disclosed systems, methods, and devices. Features may be embodied in various and alternative forms. Therefore, there is no intent that specific structural and functional details should be limiting, but rather the intention is that they provide a basis for the claims and as a representative basis for teaching one skilled in the art to variously employ the present disclosure.

A problem in the art capable of being solved by the embodiments disclosed is monitoring and maintaining an infrastructure. It has been discovered that monitoring devices with one or two way communication abilities can be used to detect faults in the municipality's systems and provide on-demand, real time, or near real time device status, maintenance, and control over the systems.

A network of monitoring devices is capable of providing a system administrator with a full picture of the current state of the system. The network includes an array of different monitoring devices each capable of sensing at least one condition. The monitoring devices may be capable of sending data to and of receiving data from at least one operations center. Communication from the remote monitoring device may be directed to a central monitoring facility, to one of a number of regional monitoring centers, to a user, and/or to a research facility. Furthermore, the system includes at least one control device. Each control device is adapted to control a different aspect of the system. The control devices may be part of the monitoring devices or may be separate units. Communication is over the Internet, but may be over a private network, a local area network, or a wide area network. The communication involves a wireless component, such as from the remote monitoring device and/or control device to a regional monitoring facility or to distributed monitors. Also, the communications are secured or encrypted such that the communications system cannot be monitored by another unknown party. Access to the system is granted through user names and passwords, although additional and/or alternate encryption methods can be employed.

One embodiment is directed to water infrastructure systems. In such systems, monitoring devices can be located throughout the system, for example, as attachments to component parts, for feedback to a network that can provide real-time information to the utility operating the network. The network operators can use the information transmitted to activate controlling devices on the network, or to dispatch repair or other services as directed by the information provided by the network. For example, if water pressure monitors on a water meter indicate a variance between locations, a water leak can be reported using the network, and controlling devices can divert water. Pressure meters can be attached to fire hydrants to monitor and report pressure losses throughout the system, providing real-time information to benefit the users of the fire hydrants (fire departments who need to be assured of adequate pressure), the users of the system (water consumers who will be affected by lower pressure), and the operators of the system (who suffer asset loss as a result of lack of real-time information about losses).

FIG. 1 depicts a system 100 for monitoring, controlling, and communicating with at least one monitoring device 110 and/or at least one control device 111. System 100 includes an operations center 105 in communication with at least one monitoring device 110 and/or one control device 111. In the preferred embodiment, there is bi-directional communication between operations center 105 and devices 110 and 111. Communications can be simplex or duplex. Communication can occur over any communications network 115 known in the art, including but not limited to wired networks, wireless networks, Zigbee networks, Bluetooth networks, Z-wave networks, WiFi networks, WiMax networks, RF networks, local area networks (LAN), internet networks, wide area networks (WAN), cellular telephone network, hardwired telephone networks, 900 MHz wireless networks, and satellite networks. In one embodiment, the network is a fixed network. For example, the fixed network can be a mesh network or a star network. Additionally, devices 110 and 111 and operations center 105 can be in direct communication or can communicate through an intermediary device, such as a relay, a repeater, a gateway, or other device capable of receiving and retransmitting a message.

Each monitoring device 110 monitors at least one aspect of the infrastructure. The monitored aspect can be one or more of the components of the infrastructure (e.g. pipe conditions, valve conditions, fire hydrant conditions, service line conditions, meter conditions, power line conditions, and battery conditions), commodity conditions (e.g. fluid or gas flow, fluid or gas pressure, fluid or gas temperature, and fluid or gas contaminants), or combinations thereof. Additionally, each monitoring device 110 can be self monitoring. For example the monitoring devices 110 determine if there is a loss of communication, low battery levels, and/or internal damage (e.g. short circuits due to water damage). Additionally, each monitoring device 110 can be structurally stable (e.g. fixed to a valve, pipe, utility pole, a hydrant, a valve box, a valve box cover, a meter, a meter box, a meter box cover, a water tower, a water tank, a pumper nozzle, a hose nozzle, or an manhole cover) or movable (e.g. allowed to move with or within the flow of water or gas in the pipes).

Figure 4A:
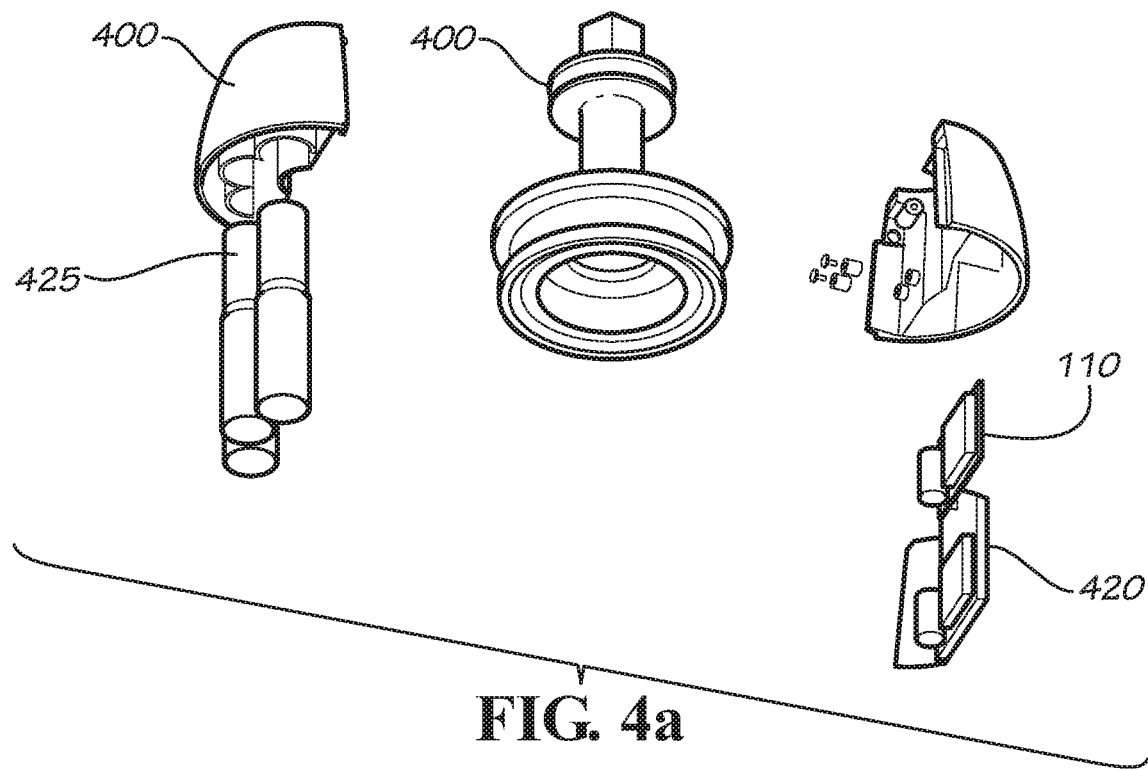
FIG. 4A is an exploded view of one embodiment of a device of the disclosure as housed within a fire hydrant.
Figure 4B:
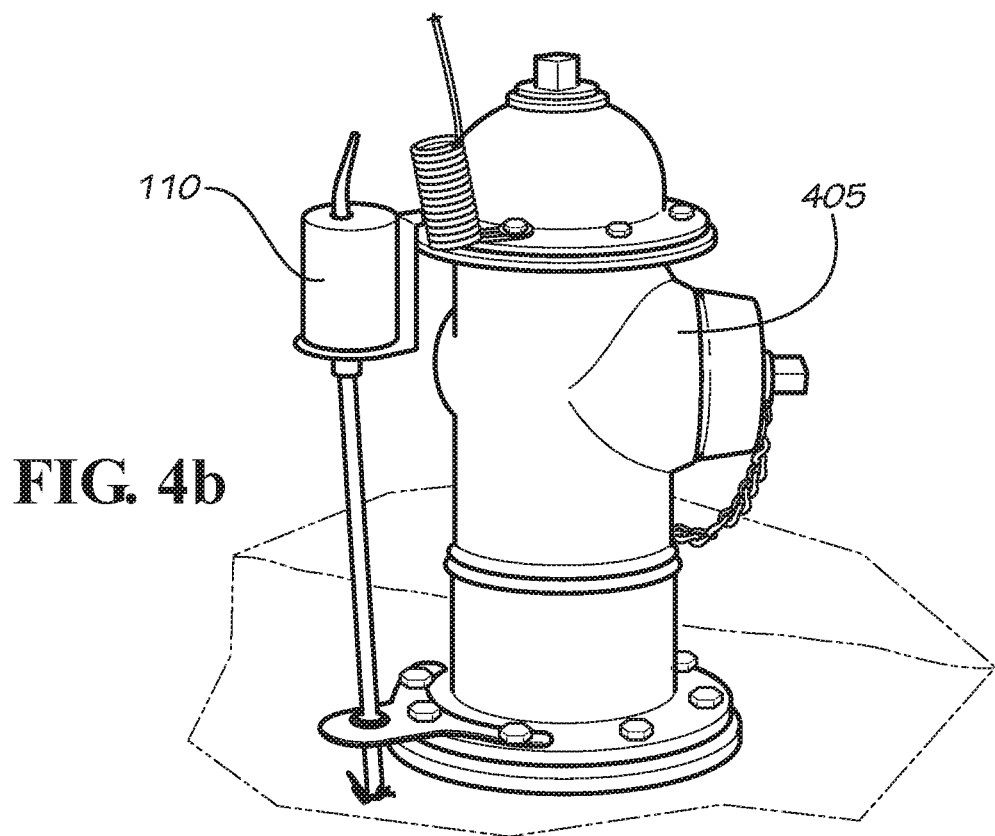
FIG. 4B is a perspective view of a device of the disclosure attached to a fire hydrant
Figure 5A:
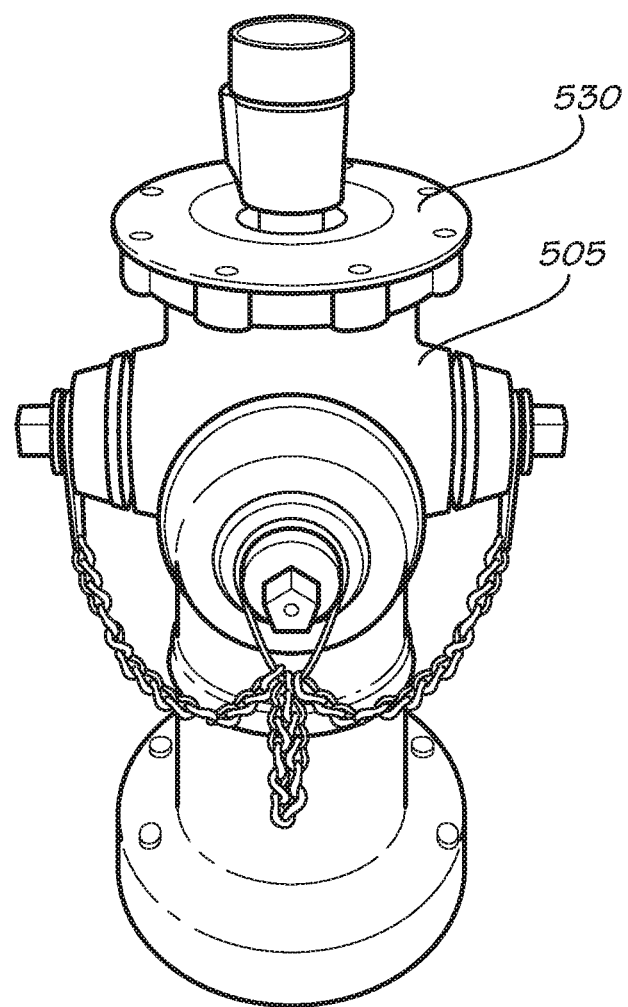
FIG. 5A is a perspective view of one embodiment of an insulation device for sealing the bonnet of the fire hydrant from the water within the fire hydrant.
Figure 5B:
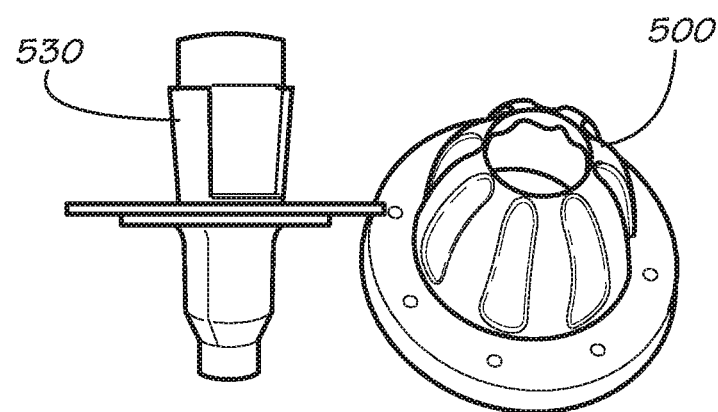
FIG. 5B is a perspective view of one embodiment of an insulation device and bonnet.

For example, a monitoring device 110 or 111 can be coupled to a fire hydrant 405, a seen in FIG. 4B. The monitoring device 110 or 111 can be located within a nozzle cap 600 (i.e. in the pumper nozzle, the hose nozzle, or in the fire truck hook up), within a body of the fire hydrant, within a bonnet, attached to an outside of the fire hydrant, or at another location on or within the fire hydrant. A housing for the monitoring device 110 or 111 is made of plastic, nylon, other synthetic or natural materials, or any other material that does not block transmissions to and from the monitoring device 110 or 111. For example, as shown in FIG. 4A, the fire hydrant bonnet 400 can contain a monitoring device 110 and a waterproof container 420 for the monitoring device 110. In some embodiments the fire hydrant bonnet 400 can also contain a power source 425. In another example, as shown in FIG. 4B, the monitoring device 110 can be coupled to the outside of a fire hydrant 405. In another embodiment, shown in FIGS. 5A and 5B, the bonnet 500 of a fire hydrant 505 can be isolated from the flow of water within the fire hydrant 505. For example, there can be a plastic, metal, or other material disc 530 that seals off a portion of the fire hydrant 505 to prevent water from reaching the interior regions of the bonnet 500.

In another embodiment, a monitoring device 110 or control device 111 is positioned within a nozzle cap 600 of a fire hydrant. A fire hydrant nozzle cap 600 is a device attached to an outlet nozzle and covers a nozzle opening. The nozzle cap 600 is furnished with a nut 605 or other device to permit the application of force to firmly attach the nozzle cap 600 to or to remove it from the outlet nozzle. FIG. 6A depicts an isometric view of an embodiment of the nozzle cap 600. In one embodiment, nozzle cap 600 is made of a composite, plastic, nylon, other synthetic or natural materials, or any other material that does not block transmissions to and from the monitoring device 110 or control device 111. The material has the same fading characteristics of the paint used on the exterior of the fire hydrant. For example, the material can have the same resistance to water, UV rays, corrosion, oxidation, or other causes of fading. Thereby, the paint and the nozzle cap 600 appear to be of the same material.

FIGS. 6B and 6C depict cutaway views of an embodiment of the nozzle cap 600. The nozzle cap 600 has an enclosure 610 which creates a cavity into which monitoring device 110 or control device 111 may be located. The cavity is enclosed by a cover 615. The enclosure 610 and cover 615 create a water tight seal able to withstand water pressures in excess of 400 psi. In various embodiments, other pressures may be utilized. Additionally, in one embodiment, nozzle cap 600 has an antenna cover 620. Antenna cover 620 can be made of the same material as nozzle cap 600 or of a different material. The location of the antenna is kept away from metal to achieve greater efficiency.

Nozzle hydrant threading 625 is provided as a connection means between the nozzle cap 600 and the fire hydrant. The nozzle cap 600 also includes enclosure threading 630 as a connection means for the enclosure 610 to connect to the nozzle cap 600. The enclosure 610 also includes connection threading 640 designed to mate with the enclosure threading 630. An antenna 650 is shown.

Each node in the network 115 detects errors in transmissions. Error detection can use cyclic redundancy codes using a table based on a defined polynomial or another method of error detection. In alternative embodiments, transmissions can be rerouted if the primary route is blocked or otherwise unavailable. Furthermore, devices 110 and 111 can confirm receipt of a message, e.g. via a hand shake protocol. In instances where confirmation is not received, the message can be resent along the same route or rerouted.

In various embodiments, each monitoring device 110 and each control device 111 is assigned a unique identifier. The unique identifier can be related to the devices' geographical locations, street addresses, order of installation, or any other method of identifying the devices 110,111. Furthermore, different types of devices 110 and 111 can have unique identifiers that include keys that are unique to that type of device. For example, the identifier for all water meters may begin with a WM, while the identifier for all leak detectors may begin with an LD. Each communication to and from a monitoring device 110 and control device 111 may include the unique identifier so that the message is received by the correct monitoring device 110 or control device 111, or so that operations center 105 can determine from where the message was sent.

Each monitoring device 110 and each control device 111 can be retrofitted to an existing system 100 or device 110,111, can be coupled to a new system 100 or device 110,111, or can be integrated into a new system 100 or device 110,111. For example, the system 100 can be connected to, work with, or work independently of a Supervisory Control and Data Acquisition (SCADA) network. In one embodiment, each monitoring device 110 and each control device 111 has a set of adapters to facilitate coupling the monitoring device 110 or control device 111 to a new or existing system 100 or device 110,111.

In one embodiment, system 100 is divided into sectors with each sector having at least one monitoring device 110 and/or at least one control device 111. Each sector can communicate directly with operations center 105 or each sector can have at least one intermediary communications device that is in communication with the monitoring device 110 and/or control device 111 and operations center 105. In one embodiment, the sectors are divided up by geographical location. For example, all of the devices in one neighborhood can be in a single sector and there is one sector for each neighborhood. In one embodiment, one intermediary communications device can service multiple sectors.

In alternative embodiments, each monitoring device 110 and/or control device 111 can communicate with adjacent monitoring devices 110 and/or control devices 111. In such embodiments, each monitoring device 110 and/or control device 111 can act as a transceiver or relay by receiving messages intended for another device 110,111 or for the operations center 105 and forwarding the message. In embodiments where the system 100 is divided into sectors, monitoring devices 110 and control devices 111 can communicate only within their sector. In other embodiments, monitoring device 110 and control device 111 can communicate with devices 110,111 in other sectors. Each monitoring device 110, control device 111, and/or the operations center 105 may be able to determine if a transmitted message was received by the intended device 110,111 and, if not, may be able to reroute the message until the message is properly received. Additionally, relay devices can be implemented in the system to further extend the range of communications. For example, relay devices can be placed on utility poles, on municipal buildings, within fire hydrants, and/or under manhole covers. In alternative embodiments, devices 110 and 111 communicate over a mesh network. In the mesh network, devices 110 and 111 can communicate with other devices 110 and 111 within the mesh network. Operations center 105 can set specified communications pathways derived from routing tables.

Operations center 105 can be located at a municipality office, a private or public company, a fire station, a police station, or any other entity that monitors operations center 105. In other embodiments, operations center 105 can be remotely hosted and accessible by the Internet. In such embodiments, operations center 105 can take advantage of cloud computing (e.g. a network of remotely hosted computers, servers, and data storage devices). Compared to non-remotely hosted computer networks, cloud computing can increase ease of use, increase access, increase security, decrease costs, be custom tailored, and provide an unrestricted expansion of storage space. Additionally, in various embodiments, there is a plurality of operations centers 105. One or more operations centers 105 can be located at different entities and each operations center 105 can monitor a different aspect of system 100. For example, in embodiments where one monitoring device 110 monitors water usage and another monitors gas leaks, the water usage aspect can be monitored by a water utility company and the gas leaks can be monitored by the gas utility company and/or the fire department. In some embodiments, there are redundant operations centers 105, where at least two operations centers 105 monitor the same aspect of system 100. Operations center 105 can send transmissions to update the firmware of devices 110 and 111.

Figure 2:
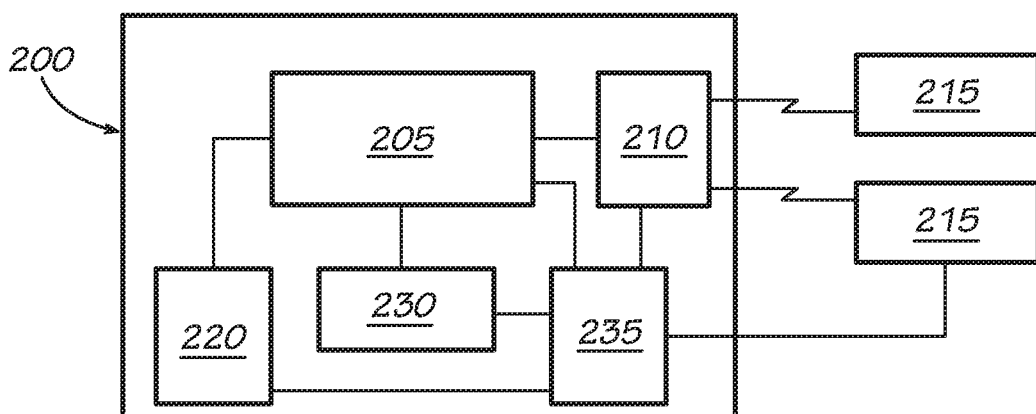
FIG. 2 is a schematic of one embodiment of a monitoring device.

FIG. 2 is a schematic of a monitoring device unit 200. Monitoring device unit 200 includes a processor 205. Processor 205 is coupled to at least one input port 210 for receiving data from sensors 215. Processor 205 is also coupled to a transceiver 220 for sending and receiving signals. Processor 205 is coupled to a data storage unit 230. Data storage unit 230 can hold a predetermined amount of data received from the sensors 215. For example, data storage unit 230 can hold data for a predetermined amount of time (e.g. one day, one week, or one month), can hold a predetermined number of readings (e.g. 10 readings, 100 readings, 1000 readings), or can hold data until directed to purge the data by the operations center 105. Additionally, data storage unit 230 can hold instructions for processor 205 to execute upon prompting from the operations center 105. Processor 205 compiles at least some of the data stored in data storage unit 230 for transmitting to the operations center 105.

Each monitoring device unit 200 may collect data and/or transmit data continuously, at specific intervals, or randomly. In embodiments where the monitoring device unit 200 collects and transmits data in a non-continuous configuration, monitoring device unit 200 may turn off or reduce power consumption during the non-data collecting periods to save energy. Processor 205 is coupled to a power source 235. Power source 235 can be a unit capable of powering processor 205 and devices attached to processor 205. For example, power source 235 can be a battery, solar panel array, wind turbine, water turbine, electrical lines, or combinations thereof. In preferred embodiments, there is also a backup power source, such as a battery. The power may derive from the operation of the system 100.

In one embodiment, processor 205 is coupled to at least one sensor 215 that monitors at least one condition associated with the monitoring device. Sensors 215 can determine the status of a device. Sensors 215 can be directly wired to processor 205 or can use wireless communication to send and receive signals from processor 205. Sensors 215 can be positioned within the monitoring device or be external to the monitoring device. In alternative embodiments, sensors 215 are positioned remote from the monitoring device. For example a sensor can be positioned in a fire hydrant, on a nearby building, or on a utility pole. In the embodiments in which sensors 215 and processor 205 communicate wirelessly, the same communications protocol can be used in the sensor/processor communication as in the processor/operations center communication, or different communications protocols can be used in the sensor/processor communication from in the processor/control center communication. For example, the sensor/processor communications can use RF protocols while the processor/control center communications can be over a wired network.

In one embodiment, sensor 215 is a use monitor. In such embodiment, the use monitor records the amount of water, gas, electricity, or other commodity that is used by a customer over a specified period of time. The use monitor can continuously record the amount of the commodity used or the use monitor can provide a signal to processor 205 that the commodity is in use. Processor 205 can transmit a signal to the operations control to alert the operations center 105 that the monitoring device 110 is being used and/or how much of the commodity is flowing through the sensor 215. The operations center 105 can request a reading from the use monitor on demand. The processor 205 or the operations center 105 can determine based on the use, if there is unauthorized use of the commodity. Upon detection of unauthorized use, at least one of processor 205 or the operations center 105 can generate an alarm that there is unauthorized use. For example, in embodiments where the use monitor is coupled to a fire hydrant 405, if the use monitor indicates that the fire hydrant 405 is in use, however no fire is reported, the operations center 105 can disseminate an alert that there is potential misuse of the fire hydrant 405.

In various embodiments, at least one sensor 215 is a tamper sensor. The tamper sensor can be a motion detector, a contact sensor, a rotation sensor, a touch sensor, a proximity sensor, a biofeedback sensor, a temperature sensor, a capacitance sensor, a resistance sensor, or any other sensor that is able to detect the presence of an object. The tamper sensor can send a message to processor 205 when the tamper sensor detects an event. The processor 205 will then evaluate the event to determine if a device being monitored is being tampered with or will relay the message to the operations center 105 for evaluation. The monitored device can be a fire hydrant, utility meter, valve, manhole cover, pump, or any other device that may be tampered with. Upon detection of a tamper event, at least one of processor 205 and the operations center 105 can generate an alarm that the device is being tampered with. The monitoring device may activate a tamper prevention device (described below). The operations center 105 will send a transmission to processor 205 telling processor 205 to disregard messages from the tamper sensor for a predetermined period of time or until another message is received from the operations center 105 telling processor 205 to resume monitoring for tamper events. For example, if a fire department needs to use a fire hydrant, the operations center 105 will send a message to processor 205 to temporarily disregard any tamper events. Once the fire department is finished using the fire hydrant the operations center 105 will send a message to processor 205 to start monitoring for tamper events again.

In some embodiments at least two of sensors 215 are leak detectors. Each leak detector can include an in-pipe leak detector and/or an exterior leak detector. In gas applications, the leak detectors are vapor sensors. While in liquid applications, the leak detectors use acoustic monitoring to determine presence and location of a leak. The energy generated from a leak is transmitted within a pipe through the commodity as well as through the pipe wall. Each leak detector can detect the vibrations made by the leak in the commodity or the pipe wall, joint or service line. To determine the location of a leak, at least two detectors must detect the same leak. Based on the velocity of the sound traveling along the pipe (V), the distance between the two detectors (D) and the delay between the times each detector detects the sound (T), the location of the leak (L) can be determined by the following equation:

$$L=(D-(V \times T))/2$$

When using the above equation, the typical velocity of sound in water is about 1500 m/s while the typical speed of sound through an iron pipe is 5100 m/s. The velocity can be measured empirically. For example, if the leak is exactly midway between the two detectors the sound would reach both detectors at the same time. Each detector may monitor continuously or at predetermined periods of time. The leak detectors can send a message to processor 205 when the leak detectors detect an event. The processor 205 can then evaluate the event to determine if there is a leak and how severe the leak is or can relay the message to the operations center 105 for evaluation. Upon detection of a leak event, at least one of processor 205 or the operations center 105 can generate an alert that there is a leak if the leak is determined to be severe enough to warrant attention.

In various embodiments, at least one sensor 215 is a smoke detector. The smoke detector can be a photoelectric detector, an ionization detector, or any other device that can detect the presence of smoke. The smoke detector can be located within the monitoring device or exterior to the monitoring device. The smoke detector monitors continuously for smoke. The smoke detector can send a message to processor 205 when the smoke detector detects an event. The processor 205 can then evaluate the event to determine if there is smoke or can relay the message to the operations center 105 for evaluation. Upon detection of smoke, at least one of processor 205 or the operations center 105 can generate an alert that there is smoke.

In some embodiments, at least one sensor 215 is a temperature sensor. The temperature sensor can be a contact sensor (e.g. thermocouples, thermistors, liquid-in-glass thermometers, resistance temperature detectors, filled system thermometers, bimetallic thermometers, semiconductor temperature sensors, and phase change indicators) or a non-contact sensor (e.g. radiation thermometers, thermal imagers, ratio thermometers, optical pyrometers, and fiber optic thermometers). The temperature sensor can be located within the monitoring device or exterior to the monitoring device. In one embodiment, the temperature sensor monitors continuously for the temperature to rise above or drop below a predetermined threshold. The temperature sensor can send a message to processor 205 when the temperature sensor detects a temperature beyond the thresholds. The processor 205 can then evaluate the event to determine if there the temperature is a problem (such as freezing pipes or fire) or can relay the message to the operations center 105 for evaluation. Upon detection of undesirable temperatures, at least one of processor 205 or the operations center 105 can generate an alert that there is an undesirable temperature condition.

In various embodiments, at least one sensor 215 is a rust and/or corrosion sensor. The corrosion sensor can detect rust and/or corrosion using any method known in the art, including but not limited to liquid penetration inspection, magnetic particle inspection, radiographic inspection, visual inspection, eddy current inspection, ultrasonic inspection, and thermographic inspection. The corrosion sensor can send a message to processor 205 when the corrosion sensor detects a rust or corrosion beyond a threshold value. The processor 205 can then evaluate the rust or corrosion to determine if there is a problem or can relay the message to the operations center 105 for evaluation. Upon detection of undesirable rust or corrosion, at least one of processor 205 or the operations center 105 can generate an alert that there is an undesirable amount of rust or corrosion.

In various embodiments, at least one sensor 215 is a fluid flow sensor. The fluid flow sensor can be used either in gas systems or liquid systems. The fluid flow sensor can detect direction of the flow, turbidity of the flow, velocity of the flow, density of the flow, viscosity of the flow, and/or any other aspect of the flow. The fluid flow sensor may be a velocimeter, a laser-based interferometer, a vane, a rotary potentiometer, a Hall effect sensor, a device to measure heat transfer caused by the flowing fluid, or any other device know in the art to measure the flow of fluid. The fluid flow sensor can send a message to processor 205 when the fluid flow sensor detects a flow anomaly. The processor 205 can then evaluate the event to determine if the anomaly is a problem or can relay the message to the operations center 105 for evaluation. Upon detection of an anomaly, at least one of processor 205 and the operations center 105 can generate an alert that there is an anomaly.

In various embodiments, at least one sensor 215 is a pressure sensor. In one embodiment, the pressure sensor is positioned within the flow of fluid or area in which the pressure is being sensed. For example, the pressure sensor can be positioned at the base of a fire hydrant and in the water to determine the water pressure within water system, in a pipe to determine gas or water pressure within a gas or water system, or in a room to determine air pressure within the room. The pressure sensor can be a piezoresistive strain gauge, a capacitive gauge, an electromagnetic gauge, a piezoelectric device, or any other device know in the art to measure pressure. The pressure sensor can send a message to processor 205 when the pressure sensor detects a pressure anomaly. The processor 205 can then evaluate the event to determine if the anomaly is a problem or can relay the message to the operations center 105 for evaluation. Upon detection of an anomaly, at least one of processor 205 or the operations center 105 can generate an alert that there is an anomaly.

In various embodiments, at least one sensor 215 is a water quality monitor. The water quality monitor can monitor a single aspect of water flowing through the system 100 or multiple aspects of the water. For example, the water quality monitor can monitor one or more of the water's bacteria levels, pharmaceutical levels, alkalinity, chlorine and/or chloramine levels, hardness, pH levels, peroxide content, iron levels, nitrate levels, nitrite levels, arsenic levels, pollution levels, oxygen levels, biomass levels, and/or any of the other contaminants regulated by the Environmental Protection Agency (EPA). In embodiments where there are multiple monitoring devices, all the devices can monitor the same aspects, each device can monitor a different aspect, or a combination thereof. In one embodiment, the water quality monitors test the water continuously, however, in alternative embodiments, the water quality monitors test the water at predetermined time intervals (e.g. once a hour, once a day, once a week, etc.). Each water quality monitor relays data to processor 205. Processor 205 can store the data on data storage unit 230 or transmit the data to the operations center 105. Either processor 205 or the operations center 105 can monitor the data received from the water quality monitors to determine if there is a change in the levels of the contaminants or if the levels of the contaminants rise above a threshold level. Upon detection of unsafe contamination levels, at least one of processor 205 or the operations center 105 can generate an alert that there is contamination in the water system.

In the embodiments where at least two monitoring devices are monitoring the same aspect of the water, the operations center 105 can determine if there is a change in the aspect of the water from the location of one monitoring device to the location of the other. If there is a change, the operations center 105 can generate an alert that there is a change in the water system and output the approximate location of the change in the water system.

In various embodiments, at least one sensor 215 is an air quality monitor. The air quality monitor can monitor a single aspect of the air or multiple aspects of the air. Furthermore, the air quality monitor can monitor the air within a facility or ambient air. For example, the air quality monitor can monitor one or more of the air's benzene levels, carbon disulfide levels, urethane levels, formaldehyde levels, phosphorus levels, naphthalene levels, parathion levels, quinoline levels, trifluralin levels, and/or any of the other contaminants whose acceptable levels have been set by the Environmental Protection Agency. In embodiments where there are multiple monitoring devices, all the devices can monitor the same aspects or each device can monitor a different aspect, or a combination thereof. In one embodiment, the air quality monitors test the air continuously, however, in preferred embodiments, the air quality monitors test the air at predetermined time intervals (e.g. once a hour, once a day, once a week, etc.). Each air quality monitor relays data to processor 205. Processor 205 can store the data on data storage unit 230 or transmit the data to the operations center 105. Either processor 205 or the operations center 105 can monitor the data received from the air quality monitors to determine if there is a change in the levels of the contaminants or if the levels of the contaminants rise above a threshold level. Upon detection of unsafe contamination levels, at least one of processor 205 or the operations center 105 can generate an alert that there is contamination in the air.

In the embodiments where at least two monitoring devices are monitoring the same aspect of the air, the operations center 105 can determine if there is a change in the aspect of the air from the location of one monitoring device to the location of the other. If there is a change, the operations center 105 can generate an alert that there is a change in the air and output the approximate location of the change in the aspect of the air. Furthermore, in embodiments where there is a time stamp associated with each reading, the operations center 105 can determine the approximate direction and speed at which the contaminant is moving.

In various embodiments, at least one sensor 215 is a radiation detector. The radiation detector can distinguish between natural sources of radiation and artificial sources of radiation or can distinguish between normal levels of radiation and abnormal levels of radiation. The radiation detector detects ionizing radiation. Ionizing radiation consists of subatomic particles or electromagnetic waves that are energetic enough to detach electrons from atoms or molecules, ionizing them. Examples of ionizing particles are energetic alpha particles, beta particles, and neutrons. The ability of an electromagnetic wave (photons) to ionize an atom or molecule depends on its frequency. Radiation on the short-wavelength end of the electromagnetic spectrum—high frequency ultraviolet, x-rays, and gamma rays—is ionizing. The radiation detector is one of a dosimeter, a Geiger counters, or a scintillation counters. Dosimeters measure an absolute dose received over a period of time. Ion-chamber dosimeters resemble pens, and can be clipped to one's clothing. Film-badge dosimeters enclose a piece of photographic film, which will become exposed as radiation passes through it. Ion-chamber dosimeters must be periodically recharged, and the result logged. Film-badge dosimeters must be developed as photographic emulsion so the exposures can be counted and logged; once developed, they are discarded. Another type of dosimeter is the TLD (Thermoluminescent Dosimeter). These dosimeters contain crystals that emit visible light when heated, in direct proportion to their total radiation exposure. Like ion-chamber dosimeters, TLDs can be re-used after they have been 'read'. Geiger counters and scintillation counters measure the dose rate of ionizing radiation directly. Preferably, the radiation detector is a solid-state device.

Upon detecting radiation, the radiation detector can relay the detection to processor 205. Processor 205 can save the detection on data storage unit 230 or transmit a message regarding the detection to the operations center 105. Processor 205 or the operations center 105 can evaluate the detection and act in accordance with the purpose of the radiation detector. For example, if the radiation detector detects radiation over a threshold level, processor 205 or the operations center 105 can generate an alert that there are unsafe radiation levels.

In various embodiments, at least one sensor 215 is a motion detector. The motion detector can be a radar-based motion detector, a photo-sensor motion detector, a passive infrared motion detector, a magnetic motion detector, a pressure sensitive motion detector, or any other device capable of detecting the motion of objects. The motion detector can be used, for example, to count the number of cars passing through an intersection to control a traffic light, for tamper prevention as described above, for security purposes, and/or to control street lights. The motion detector can be placed within the monitoring device or exterior to the monitoring device. Upon detecting motion, the motion detector can relay the detection to processor 205. Processor 205 can save the detection on data storage unit 230 or transmit a message regarding the detection to the operations center 105. Processor 205 or the operations center 105 can evaluate the detection and act in accordance with the purpose of the motion detector. For example, if the motion detector detects a predetermined number of vehicles have passed the monitoring device, processor 205 or the operations center 105 can cause a traffic light to switch from green to red. As a second example, if the motion detector detects a motion after a predetermined time, e.g. after sunset, processor 205 or the operations center 105 can cause the street lights near the monitoring device to illuminate for a predetermined period of time.

In various embodiments, at least one sensor 215 is a tiltmeter. The tiltmeter can be a pendulum, a water tube, a bubble-level meter, and/or a MEMS electronic meter. The tiltmeter can be located on devices within the system, such as, but not limited to, pipes, fire hydrants, meters, valves, utility poles, manhole covers, and light posts. The tiltmeter can send a message to processor 205 when the sensor detects a tilt beyond a threshold value. The processor 205 can then evaluate the tilt to determine if there is a problem or can relay the message to the operations center 105 for evaluation. Upon detection of undesirable tilt, at least one of processor 205 or the operations center 105 can generate an alert that there is an undesirable tilt. For example, if a utility pole is struck by a car, the tiltmeter will indicate that the utility pole is tilting at an undesirable level and the operations center 105 can alert the municipality to send out a repair crew to assess the situation and repair the utility pole.

In various embodiments, at least one sensor 215 is a proximity sensor. The proximity sensor can use electromagnetic technology, electrostatic technology, infrared technology, or a touch switch. The proximity sensor can detect if devices are properly closed or if devices are improperly touching. The proximity sensor can send a message to processor 205 when the proximity sensor detects proximity beyond a threshold value. The processor 205 can then evaluate the proximity to determine if there is a problem or can relay the message to the operations center 105 for evaluation. Upon detection of undesirable proximity, at least one of processor 205 or the operations center 105 can generate an alert that there is an undesirable proximity. For example, if a valve is improperly closed, the proximity sensor will indicate that the valve is not closed and processor 205 can alert the municipality to take proper actions to close the valve.

In various embodiments, at least one sensor 215 is a visual or audio device. The device can be an infrared camera, a video camera, a still camera, a digital camera, a film camera, a mobile vision device, a microphone, a vibration detector, combinations thereof, or any other device capable of acquiring an image or sound. In one embodiment, the device is a digital video camera that takes video images continuously. In another embodiment, the device is a digital still camera that takes still images at regular intervals or upon command from processor 205. In alternative embodiments, the device can be a traffic camera and take a picture when instructed to by processor 205, for example upon determination that a vehicle is running a red light. In other embodiments, the device is used to perform visual inspections of the system infrastructure. For example, the field of view of the device can include a device within the system that is apt to corrode and the camera can provide an easy method to visually inspect any degradation of the device. The device can send image data to processor 205 where the data is stored on data storage unit 230 or is transmitted to the operations center 105. In various embodiments, image or sound data is streamed continuously from the device to processor 205 and from processor 205 to the operations center 105. The data stream can either be live or delayed. The device can be located on the monitoring device, near the monitoring device, or within the monitoring device with a portion of the device extending outside the monitoring device or with a hole in the monitoring device through which the device can obtain images or sounds. In some embodiments, the device is positioned on an actuator. The actuator can move to reposition the field of view of the device. The actuator can move upon demand from processor 205 or can move autonomously. In the embodiments where the actuator moves autonomously, the movement can be continuous or sporadic.

In various embodiments, at least one sensor 215 is a Global Positioning System (GPS) receiver. In one embodiment, the GPS receiver is located on devices within the system 100, such as, but not limited to, pipes, fire hydrants, meters, valves, utility poles, manhole covers, and light posts. The GPS receiver can send a message to processor 205 indicating GPS location. The processor 205 can then relay the message to the operations center 105 for evaluation, conformation, and documenting. Upon detection of unexpected GPS location, at least one of processor 205 or the operations center 105 can generate an alert that the GPS receiver has moved, possibly indicating that the device has been dislodged, tampered with, or stolen. Additionally, the GPS location can be used, for example, by emergency responders to locate fire hydrants, or repair crews to determine the location of a buried device. In such embodiments, the operations center 105 can disseminate information to the emergency responders or repair crews to easily locate the device. The dissemination can occur by any method, including but not limited to, verbally, over a telecommunications network (e.g. to a smart phone or portable computer), or over a shortwave radio. In embodiments where the monitoring device is moving with the flow of fluid, the sensor can provide updated locations of the monitoring device to track, for example, the flow or contamination levels within the flow.

Other possible sensors 215 connected to monitoring device unit 200 can include, but are not limited to, flow rate meters, backflow meters, system status monitors, and power level monitors.

Figure 3:
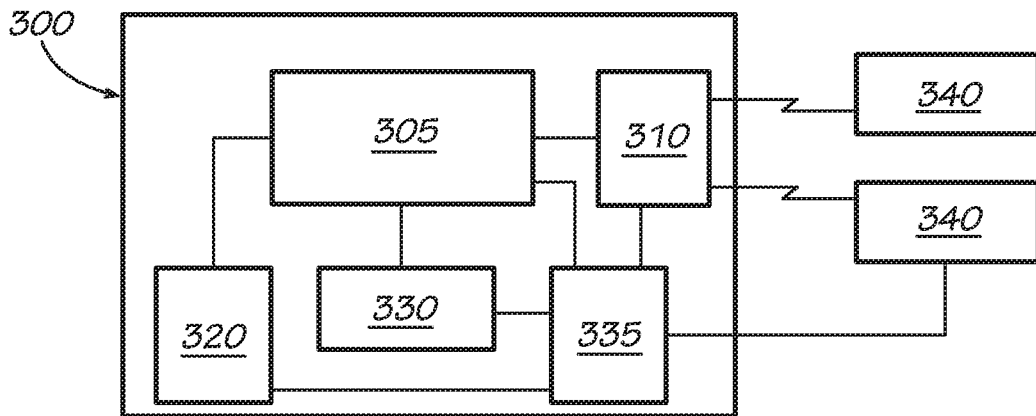
FIG. 3 is a schematic of one embodiment of a control device.

FIG. 3 is a schematic of a control device 300. Control device 300 includes a processor 305. Processor 305 is coupled to at least one output port 310 for controlling an output device 340. Processor 305 is also coupled to a transceiver 320 for sending and receiving signals. Processor 305 is communicatively coupled to output port 310. Output port 310 is connected to at least one output device 340. Each output device 340 can have the same purpose or each output device 340 can have a different purpose, or combinations thereof. Output devices 340 can be located within control device 300 or external to control device 300, as shown. Furthermore, output devices 340 can be attached to control device 300 or can be remote from control device 300. Output devices 340 communicate with output port 310 through wired or wireless communication channels. In various embodiments, output devices 340 are capable of bidirectional communication. In various embodiments, control device 300 is an integral part of a monitoring device. In such embodiments, the control device 300 and the monitoring device can share the same processor and/or transceiver.

In various embodiments, processor 305 is coupled to a data storage unit 330 that may be a database in some embodiments. Data storage unit 330 may store instructions for processor 305 of how to control output devices 340. In various embodiments, processor 305 is coupled to a power source 335. Power source 335 can be any device capable of powering processor 305 and any devices attached to processor 305. For example, power source 335 can be a battery, solar panel array, wind turbine, water turbine, electrical lines, or combinations thereof. In various embodiments, there is also a backup power source, such as a battery.

In various embodiments, at least one output device 340 is an actuator control device. The actuator control device can control any type of actuator, including but not limited to, a tamper prevention device, a locking device, a camera motion device, a fire hydrant nut opening device, or a valve. The actuator control device can control the actuator autonomously or upon demand from processor 305. For example, upon receiving a signal that a particular event has been sensed, processor 305 may send a command to the actuator control device to act in a particular manner. Likewise, in some embodiments the control signal may come from the operations center 105. The actuator can be mechanical, electrical, or a combination thereof.

In various embodiments, at least one output device 340 is an alarm. The alarm can be a visual alarm, an audible alarm, a tactile (i.e. vibration) alarm, or a combination thereof. The alarm can be located within the monitoring device, exterior to the monitoring device, at the operations center 105, remote from the system, or any other location sufficient to alert. Furthermore, there can be more than one alarm at different locations. For example, in the embodiments where there is a smoke detector, there can be an audible alarm located within the fire detector to alert people around the monitoring device of a potential fire, there can be an audible alarm at the fire station to alert the fire department of the potential fire, and there can be a visual alarm at the gas utility company to indicate that the flow gas in the vicinity of the potential fire should be shut off. In various embodiments the alarm is controlled by the processor 305, while in other embodiments the alarm is controlled by the operations center 105. In various embodiments, the alarm has an on/off switch controllable locally.

In various embodiments, at least one output device 340 is a tamper prevention device. The tamper prevention device can be a mechanical lock, an alarm, a light, an electrical shock generator, a retaining device, an electrical lock, or any other device capable of preventing tampering. The tamper prevention device may merely deter tampering or may incapacitate a person who is trying to tamper with the device, depending on the level of security. In some embodiments the tamper prevention device is controlled by the processor 305, while in other embodiments the tamper prevention device is controlled by the operations center 105.

In various embodiments, at least one output device 340 is a Radio-Frequency Identification (RFID) device. The RFID device can broadcast information about the device to which it is attached. For example, the RFID device may broadcast manufacturer information, location information, last service date, device information (e.g. make, model, and/or year), current status (e.g. a valve can broadcast if it is open or closed), etc. In some embodiments the RFID device is updateable by the processor 305 or by the operations center 105. The RFID device can be either an active (e.g. battery powered) or passive (e.g. require an external source to provoke signal transmission) device.

EXAMPLES

A system of the disclosure is monitoring a water distribution infrastructure. The system is used to automatically control the water pressure within the system. Such a system includes a number of water meters disbursed throughout the infrastructure relaying real time use information to a control center. Upon a determination by the operations center that there is low usage of the system (e.g. at night) based on information received by a predetermined number of the water meters, the operations center causes pumps supplying pressure within the system to reduce or cease pumping. Thereby cutting down on the electricity used by the pumps while maintaining enough pressure throughout the infrastructure to satisfy any water needs. The determination to reduce or cease pumping can be also based on information received from pressure sensors disbursed throughout the infrastructure. For example, if the pressure within the infrastructure exceeds a threshold value, the operations center causes the pumps to reduce or cease pumping.

In another example, the system is used to assist in maintaining the infrastructure. Water pipes and valves are often buried underground making it difficult to locate, assess the status of the devices, and repair them if necessary. Using an example of the above described system, each device is equipped with a monitoring the device. The monitoring device, for example, may monitor for corrosion using a corrosion monitor, geographical location using a GPS receiver, and leaks using a leak detector. Upon detection of corrosion and/or a leak, the monitoring device sends a message to the operations center where the information is analyzed. The operations center is able to make a determination if the corrosion and/or leak is severe enough to warrant fixing, if the corrosion and/or leak should be watched to determine if it worsens, or if the corrosion and/or leak can be ignored. The operations center will also alert a person of the situation for further assessment.

If it is determined that the corrosion and/or leak should be fixed, the operations center disseminates information to a repair crew and redirects water flow away from the device. Such information can include location of the device, based on data received the GPS receiver, problem associated with the device, device information (e.g. make, model, and/or year), etc. The monitoring device can also be equipped with a RFID transmitter, which transmits at least some of the above information. The repair crew receives the information on a smart phone, a portable computer, or other device capable of receiving such information. Upon completion of the repair, the operations center updates the system to indicate a new last repaired date for the device.

In another Example, the system is monitored by several entities within a municipality at the same time. For example, a fire department, a gas utility, a water utility, an electric utility, and traffic control center all monitor the system concurrently. Upon detection of smoke by a monitoring device, the control center alerts each entity of a potential fire. The location of the potential fire is determined by cross-referencing the ID number of the monitoring device with a lookup table or based on information received from a GPS receiver. The fire department uses the location information to send out emergency response personnel to the vicinity of the potential fire. The gas utility uses the location information to divert or shut off gas flow to the vicinity of the potential fire. The water utility uses the location information to divert water to or increase water pressure in the vicinity of the potential fire as well as determines if any fire hydrants in the vicinity of the potential fire are potentially damaged (e.g. are tilted at an unusual angle, are receiving no or little water pressure, or have been tampered with) based on information received from monitoring devices attached to the fire hydrants. The location of the fire hydrants is determined by cross-referencing the ID number of the monitoring device with a lookup table or based on information received from a GPS receiver. The water utility automatically alerts the fire department as to which fire hydrants to use. The water utility also disables any tamper prevention devices associated with the fire hydrants. The electric utility receives a signal that additional pressure may be needed within the water system and provides an increased electrical load to the water pumps. Additionally, the traffic control center adjusts traffic lights en route from the fire station to the vicinity of the potential fire to assist the fire trucks in arriving quickly and safely.

In another example, the system is used to monitor contamination of the fluid flowing through the system. The system includes pressure sensors, leak detectors and contamination detectors. Leaks within the system can cause a pressure drop throughout the system which can lead to contaminants being drawn into the system. For example, if a pipe is under water and the pressure inside the pipe drops below the pressure outside the pipe, the exterior water will flow into the pipe. Therefore, the system has several monitoring devices to check for such potential or actual contamination. The pressure sensors will indicate if the pressure within the system drops below a threshold level at which contaminants can be drawn into the system. The leak detectors will indicate that there is a leak through which contaminants can enter the system. While the contamination detectors will indicate if there is contamination within the system, indicating a possible breach of the infrastructure of the system.

Other embodiments and uses of the disclosed systems, methods, and devices will be apparent to those skilled in the art from consideration of the specification and practice disclosed herein. All references cited herein, including all publications, U.S. and foreign patents and patent applications, are specifically and entirely incorporated by reference. It is intended that the specification and examples be considered exemplary only with the true scope and spirit of the disclosure indicated by the following claims. Furthermore, the term "comprising of" includes the terms "consisting of" and "consisting essentially of" All examples illustrate possible embodiments but should not be viewed as limiting the scope of the disclosure.

The invention claimed is:

1. An infrastructure monitoring assembly comprising:
a fire hydrant defining a cavity, the fire hydrant comprising a body and a bonnet, the bonnet defining a top bonnet end and a bottom bonnet end, a nut defined at the top bonnet end, the body defining a top end and a bottom end, the cavity extending into the body from the bottom end of the body towards bottom bonnet end of the bonnet coupled to the top end of the body, the bonnet sealed off from the cavity, the bonnet defining an interior region;
a pipe connected in fluid communication with the fire hydrant, the pipe coupled to the bottom end of the body, a fluid at least partially filling the pipe;
a sensor positioned contacting the fluid, the sensor configured to measure a parameter of the fluid; and
a processor connected in communication with the sensor, the processor configured to receive a signal from the sensor, the processor positioned between the nut and the bottom bonnet end inside the interior region of the bonnet and outside of the cavity.

2. The infrastructure monitoring assembly of claim 1, wherein:
the processor is positioned within a monitor housing;
the monitor housing is coupled to the fire hydrant; and
the sensor is positioned external to the monitor housing.

3. The infrastructure monitoring assembly of claim 1, wherein the processor is connected in electrical communication with the sensor.

4. The infrastructure monitoring assembly of claim 1, wherein the processor is connected in wireless communication with the sensor.

5. The infrastructure monitoring assembly of claim 1, wherein the sensor is positioned within the pipe.

6. The infrastructure monitoring assembly of claim 1, wherein the sensor is positioned within a base of the fire hydrant.

7. The infrastructure monitoring assembly of claim 1, wherein the fluid is water.

8. The infrastructure monitoring assembly of claim 1, wherein the sensor is a pressure sensor, and wherein the sensor monitors a pressure of the fluid.

9. The infrastructure monitoring assembly of claim 1, further comprising an antenna connected in electrical communication with the processor, the antenna configured to transmit information about the parameter of the fluid.

10. The infrastructure monitoring assembly of claim 9, wherein the antenna is connected through wireless communication with an operations center.

11. The infrastructure monitoring assembly of claim 1, wherein:
the fire hydrant is positioned at least partially above a ground level;
the pipe is positioned at least partially below the ground level; and
the sensor is positioned below the ground level.

12. The infrastructure monitoring assembly of claim 1, wherein the sensor and the processor are configured to detect leaks in the pipe.

13. The infrastructure monitoring assembly of claim 1, wherein:
the fire hydrant defines a nozzle;
the fire hydrant further comprises a nozzle cap;
the nozzle cap seals the nozzle; and
the nozzle and the nozzle cap further define the cavity.

14. The infrastructure monitoring assembly of claim 1, wherein the bonnet comprises a water proof container, and wherein the processor is positioned within the waterproof container.

15. A method for monitoring an infrastructure network, the method comprising:
positioning a sensor in contact with a fluid, the fluid at least partially filling a pipe of the infrastructure network, the pipe connected in fluid communication with a fire hydrant of the infrastructure network, the fire hydrant defining a cavity, the fire hydrant comprising a body and a bonnet, the bonnet defining a top bonnet end and a bottom bonnet end, a nut defined at the top bonnet end, the body defining a top end and a bottom end, the cavity extending into the body from the bottom end of the body towards the top end of the body, the bottom bonnet end of the bonnet coupled to the top end of the body, the bonnet sealed off from the cavity, the bonnet defining an interior region, the pipe coupled to the bottom end of the body;
measuring a parameter of the fluid with the sensor;
receiving a signal from the sensor with a processor, the signal conveying information about the parameter, the processor positioned between the nut and the bottom bonnet end inside the interior region of the bonnet and outside of the cavity; and
transmitting the information from an antenna to an operation center, the antenna connected in wireless communication with the operation center, the antenna connected in electrical communication with the processor.

16. The method of claim 15, wherein:
the processor is positioned within a monitor housing;
the monitor housing is coupled to the fire hydrant; and
the sensor is positioned external to the monitor housing.

17. The method of claim 15, wherein:
the fire hydrant is positioned at least partially above a ground level;
the pipe is positioned at least partially below the ground level; and
the sensor is positioned below the ground level.

18. The method of claim 15, wherein measuring the parameter of the fluid with the sensor comprises measuring a pressure of the fluid.

19. The method of claim 15, further comprises detecting a leak within the pipe.

20. The method of claim 15, wherein the sensor is positioned within the pipe.

21. The method of claim 15, wherein the sensor is positioned within the fire hydrant.

22. The method of claim 15, wherein the sensor is connected in electrical communication with the processor.

23. The method of claim 15, wherein the sensor is connected in wireless communication with the processor.

24. The method of claim 15, wherein:
the fire hydrant defines a nozzle;
the fire hydrant further comprises a nozzle cap;
the nozzle cap seals the nozzle; and
the nozzle and the nozzle cap further define the cavity.

25. An infrastructure monitoring system comprising:
an infrastructure network comprising a fire hydrant and a pipe, the pipe connected in fluid communication with the fire hydrant, the pipe at least partially filled with a fluid, the fire hydrant defining a cavity, the fire hydrant comprising a body and a bonnet, the bonnet defining a top bonnet end and a bottom bonnet end, a nut defined at the top bonnet end, the body defining a top end and a bottom end, the cavity extending into the body from the bottom end of the body towards the top end of the body, the bottom bonnet end of the bonnet coupled to the top end of the body, the bonnet sealed off from the cavity, the bonnet defining an interior region, the pipe coupled to the bottom end of the body;
a monitoring device comprising a sensor, a processor, and an antenna, the processor connected in communication with the sensor and the antenna, the processor positioned between the nut and the bottom bonnet end inside the interior region of the bonnet and outside of the cavity, the sensor positioned in contact with the fluid, the sensor configured to measure a parameter of the fluid; and
an operation center connected in communication with the monitoring device.

26. The infrastructure monitoring system of claim 25, wherein the operation center is connected in wireless communication with the monitoring device.

27. The infrastructure monitoring system of claim 25, wherein the sensor is positioned within the fire hydrant.

28. The infrastructure monitoring system of claim 25, wherein the sensor is positioned within the pipe.

29. The infrastructure monitoring system of claim 25, wherein the sensor is connected in electrical communication with the processor.

30. The infrastructure monitoring system of claim 25, wherein the sensor is connected in wireless communication with the processor.

31. The infrastructure monitoring system of claim 25, wherein:
the monitoring device further comprises a housing;
the processor is positioned within the housing; and
the housing is coupled to the fire hydrant.

32. The infrastructure monitoring system of claim 31, wherein the sensor is positioned external to the housing.

33. The infrastructure monitoring system of claim 25, wherein:
the fire hydrant defines a nozzle;
the fire hydrant further comprises a nozzle cap;
the nozzle cap seals the nozzle; and
the nozzle and the nozzle cap further define the cavity.

* * * * *